United States Patent
Nakamura et al.

(10) Patent No.: US 11,889,235 B2
(45) Date of Patent: Jan. 30, 2024

(54) IMAGE DISPLAY APPARATUS

(71) Applicant: SONY GROUP CORPORATION, Tokyo (JP)

(72) Inventors: Tomoharu Nakamura, Tokyo (JP); Hajime Kikuhara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 200 days.

(21) Appl. No.: 17/603,847

(22) PCT Filed: Apr. 14, 2020

(86) PCT No.: PCT/JP2020/016376
§ 371 (c)(1),
(2) Date: Oct. 14, 2021

(87) PCT Pub. No.: WO2020/218081
PCT Pub. Date: Oct. 29, 2020

(65) Prior Publication Data
US 2022/0239873 A1    Jul. 28, 2022

(30) Foreign Application Priority Data

Apr. 26, 2019 (JP) .................................. 2019-086535

(51) Int. Cl.
*H04N 9/31* (2006.01)
*G02B 26/08* (2006.01)
*G02B 27/09* (2006.01)

(52) U.S. Cl.
CPC ....... *H04N 9/3152* (2013.01); *G02B 26/0833* (2013.01); *G02B 27/0961* (2013.01); *G02B 27/0977* (2013.01); *H04N 9/3164* (2013.01)

(58) Field of Classification Search
CPC ............... H04N 9/3152; H04N 9/3164; G02B 27/0961; G02B 27/0977; G02B 26/0833
See application file for complete search history.

(56) References Cited

U.S. PATENT DOCUMENTS

| | | | |
|---|---|---|---|
| 6,652,104 B2 * | 11/2003 | Nishida | H04N 9/3194 353/69 |
| 6,877,863 B2 * | 4/2005 | Wood | H04N 9/3185 353/42 |

(Continued)

FOREIGN PATENT DOCUMENTS

| | | |
|---|---|---|
| CN | 107861178 A | 3/2018 |
| CN | 108292085 A | 7/2018 |

(Continued)

OTHER PUBLICATIONS

International Search Report and Written Opinion of PCT Application No. PCT/JP2020/016376, dated Jun. 23, 2020, 12 pages of ISRWO.

Primary Examiner — Michael B. Pierorazio
(74) Attorney, Agent, or Firm — CHIP LAW GROUP

(57) ABSTRACT

An image display apparatus according to one embodiment of the present disclosure includes: an output unit including a light source and outputting projection light outputted from the light source along a predetermined axis; an irradiation target member to be irradiated with the projection light; a first optical member disposed opposite to the output unit along the predetermined axis and controlling an incident angle of the projection light to be incident on the irradiation target member; and a second optical member included in the output unit and adjusting an illumination range of the projection light to be incident on the first optical member such that the illumination range has an aspect ratio of substantially the same as an aspect ratio of an outer shape of the first optical member.

18 Claims, 19 Drawing Sheets

(56) References Cited

U.S. PATENT DOCUMENTS

| | | | | |
|---|---|---|---|---|
| 7,070,283 | B2* | 7/2006 | Akutsu | H04N 9/3194 353/30 |
| 7,182,466 | B2* | 2/2007 | Sunaga | H04N 5/74 353/69 |
| 7,270,421 | B2* | 9/2007 | Shinozaki | G03B 21/142 353/121 |
| 7,359,575 | B2* | 4/2008 | Bassi | G06T 3/0093 345/427 |
| 7,441,906 | B1* | 10/2008 | Wang | G03B 21/14 353/121 |
| 7,782,387 | B2* | 8/2010 | Azuma | H04N 23/635 359/662 |
| 7,967,451 | B2* | 6/2011 | Chen | G03B 21/14 353/50 |
| 2002/0051095 | A1* | 5/2002 | Su | H04N 9/3194 348/745 |
| 2002/0122161 | A1* | 9/2002 | Nishida | H04N 9/3194 353/70 |
| 2003/0210381 | A1* | 11/2003 | Itaki | H04N 5/74 353/70 |
| 2004/0156024 | A1* | 8/2004 | Matsuda | H04N 9/3185 353/70 |
| 2005/0046803 | A1* | 3/2005 | Akutsu | H04N 9/3194 353/69 |
| 2005/0073661 | A1* | 4/2005 | Tamura | H04N 9/3194 353/70 |
| 2005/0151934 | A1* | 7/2005 | Akutsu | G03B 21/147 353/69 |
| 2005/0237492 | A1* | 10/2005 | Shinozaki | H04N 9/3185 353/69 |
| 2006/0098167 | A1* | 5/2006 | Sato | G03B 21/26 353/35 |
| 2006/0203207 | A1* | 9/2006 | Ikeda | H04N 9/3185 353/70 |
| 2007/0008344 | A1* | 1/2007 | Medina | H04N 9/3185 345/647 |
| 2007/0257941 | A1* | 11/2007 | Plut | G06F 9/451 345/660 |
| 2007/0285626 | A1* | 12/2007 | Miyasaka | G03B 21/206 353/85 |
| 2009/0278999 | A1* | 11/2009 | Ofune | H04N 21/47 348/E3.048 |
| 2010/0002123 | A1* | 1/2010 | Nozaki | H04N 23/00 348/E5.022 |
| 2010/0045942 | A1* | 2/2010 | Furui | H04N 9/3194 353/69 |
| 2011/0210979 | A1* | 9/2011 | Furui | H04N 9/3147 345/619 |
| 2011/0234994 | A1* | 9/2011 | Uchiyama | H04N 9/3185 353/121 |
| 2011/0285971 | A1* | 11/2011 | Oka | H04N 9/3185 353/70 |
| 2011/0292351 | A1* | 12/2011 | Ishii | H04N 9/3185 353/69 |
| 2015/0323861 | A1* | 11/2015 | Saitou | G03B 21/2013 353/31 |
| 2019/0011820 | A1* | 1/2019 | Nohechi | G03B 21/208 |
| 2019/0391313 | A1* | 12/2019 | Nakamura | G03H 1/2286 |

FOREIGN PATENT DOCUMENTS

| | | |
|---|---|---|
| CN | 110383833 A | 10/2019 |
| DE | 112018001283 T5 | 12/2019 |
| JP | 2004-012477 A | 1/2004 |
| JP | 2017-142482 A | 8/2017 |
| JP | 2017-219858 A | 12/2017 |
| WO | 2017/119121 A1 | 7/2017 |
| WO | 2018/163945 A1 | 9/2018 |
| WO | 2019/071951 A1 | 4/2019 |

* cited by examiner

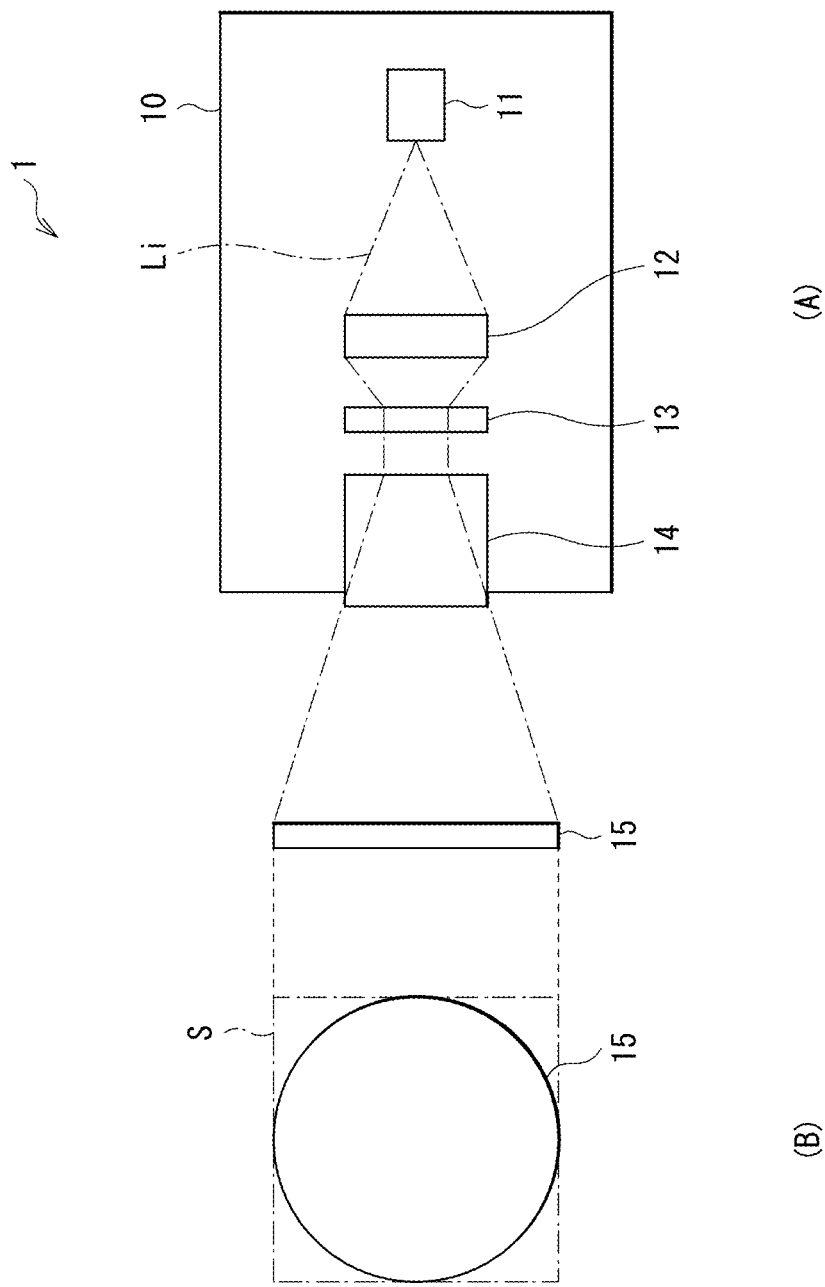
[FIG. 1]

[FIG. 2]
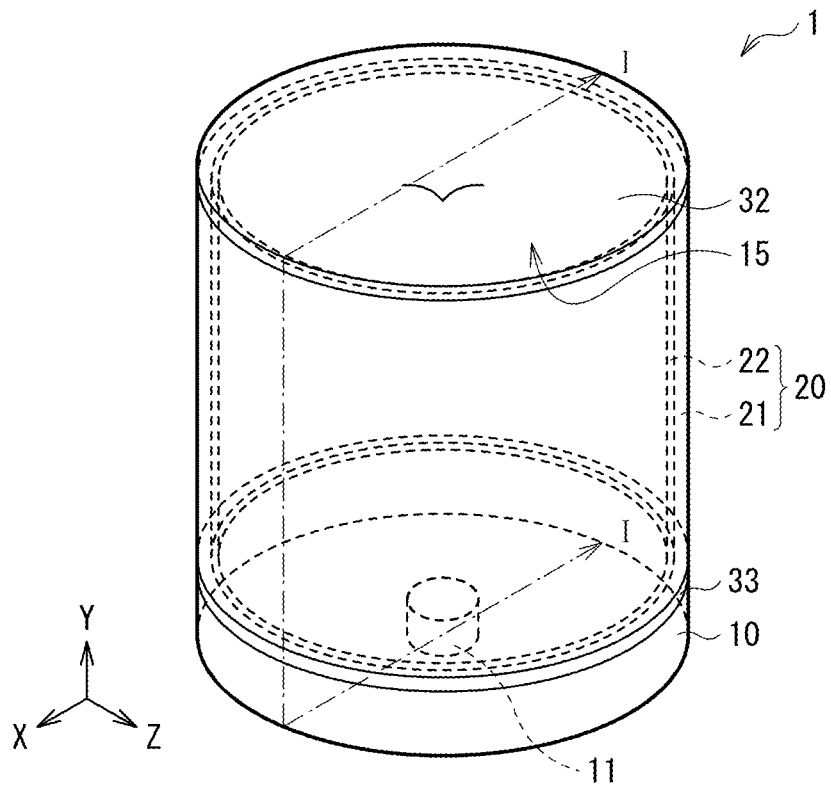
[FIG. 3]
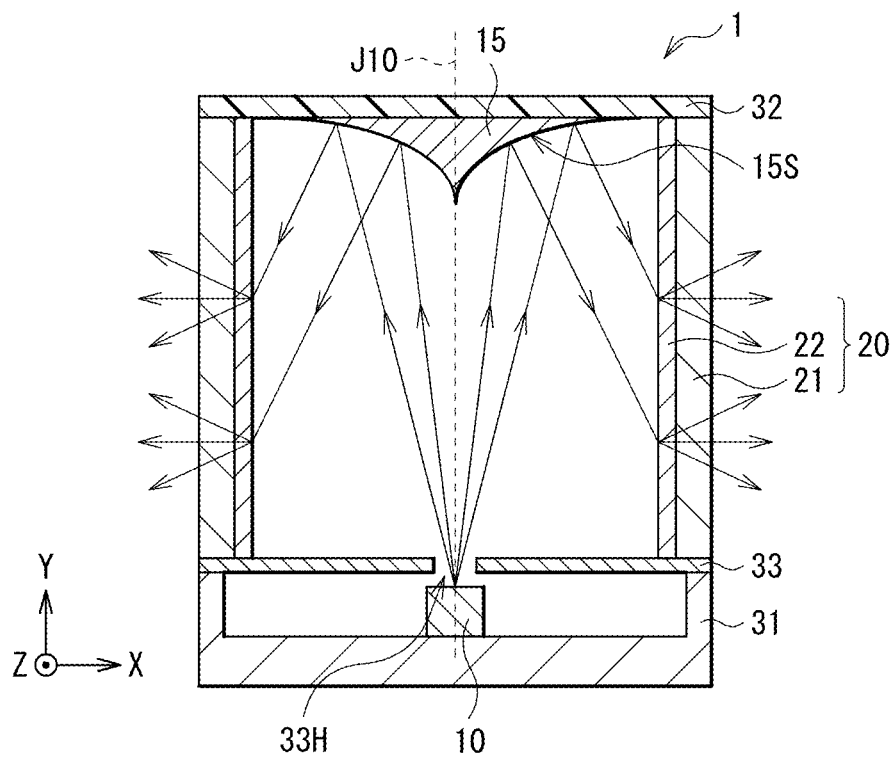

[FIG. 4]
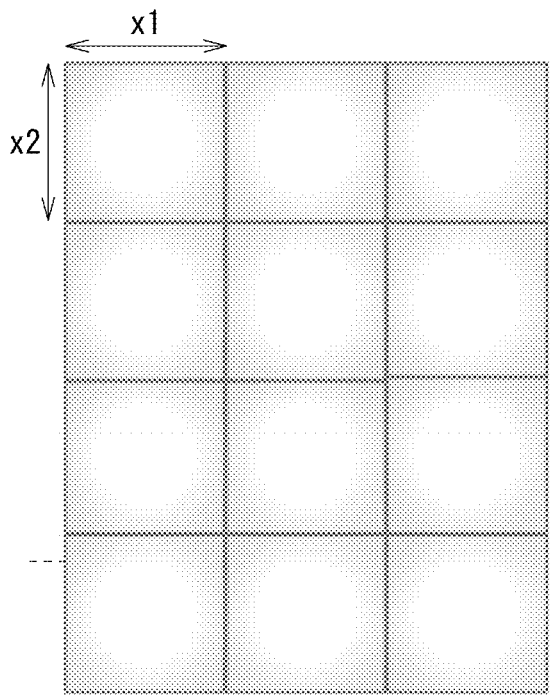
[FIG. 5]
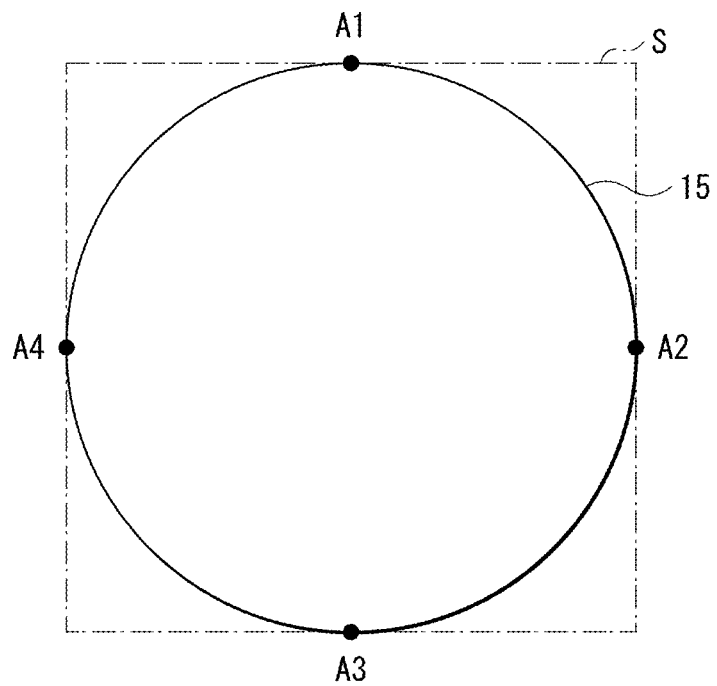

[FIG. 6]
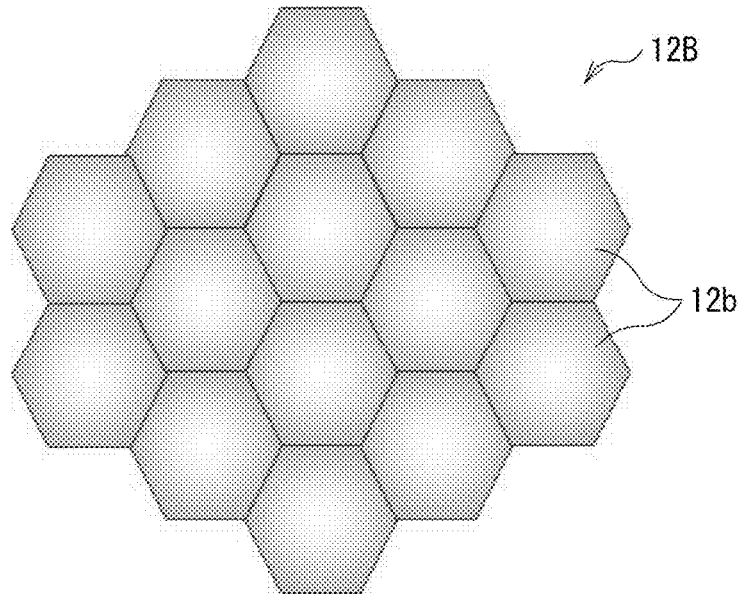
[FIG. 7]
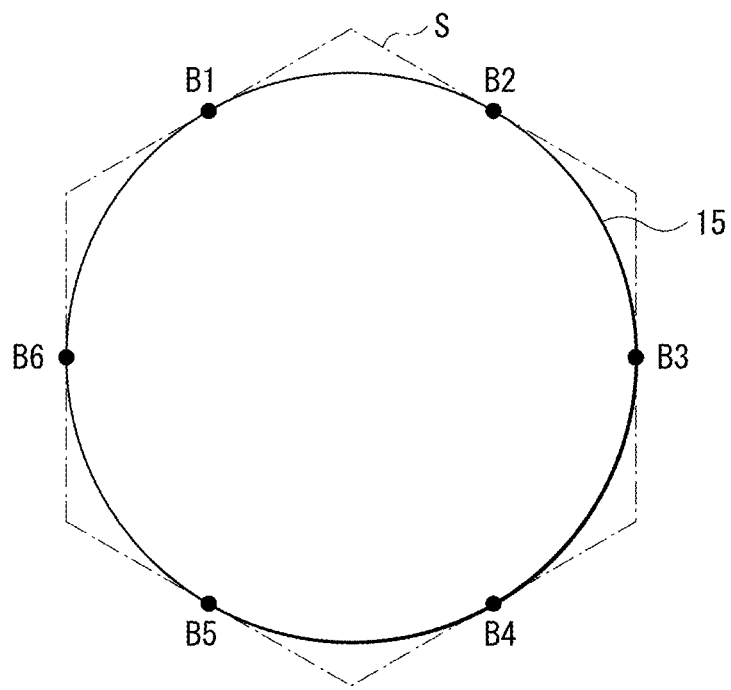

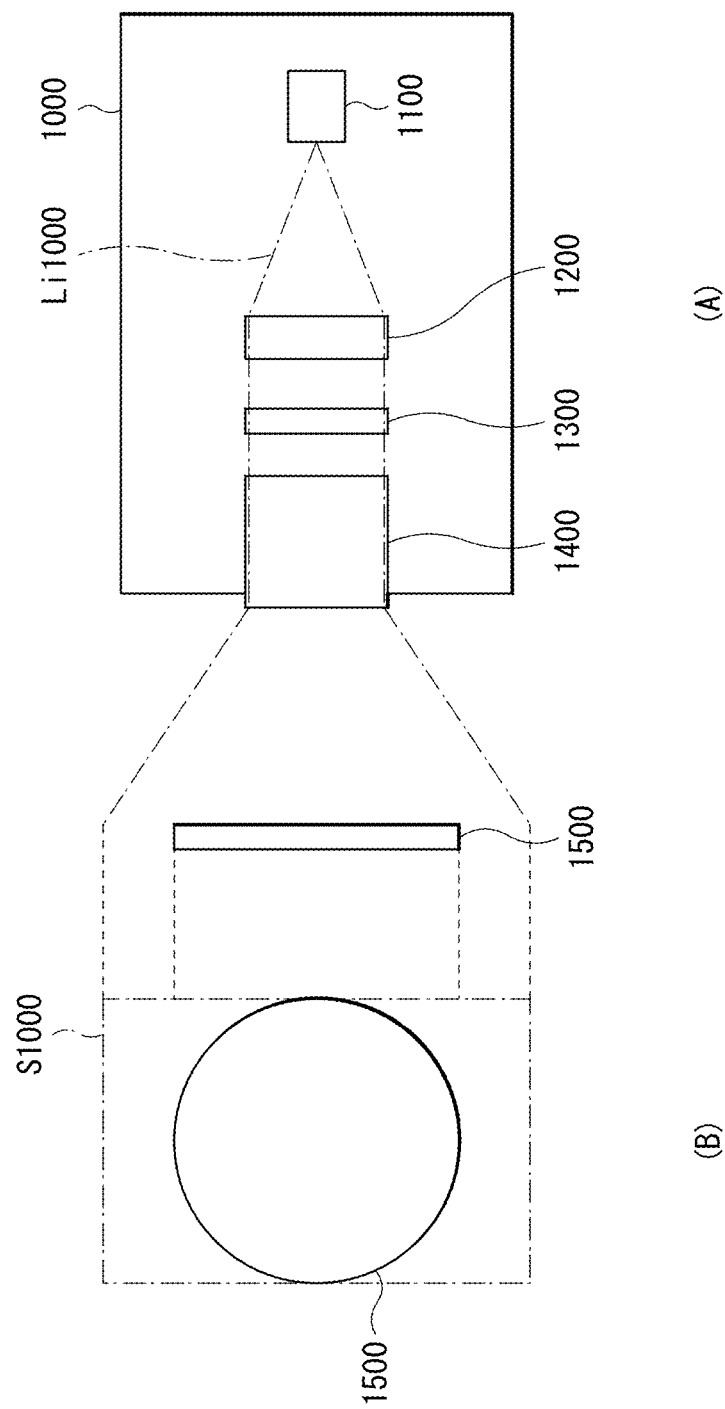
[FIG. 8]

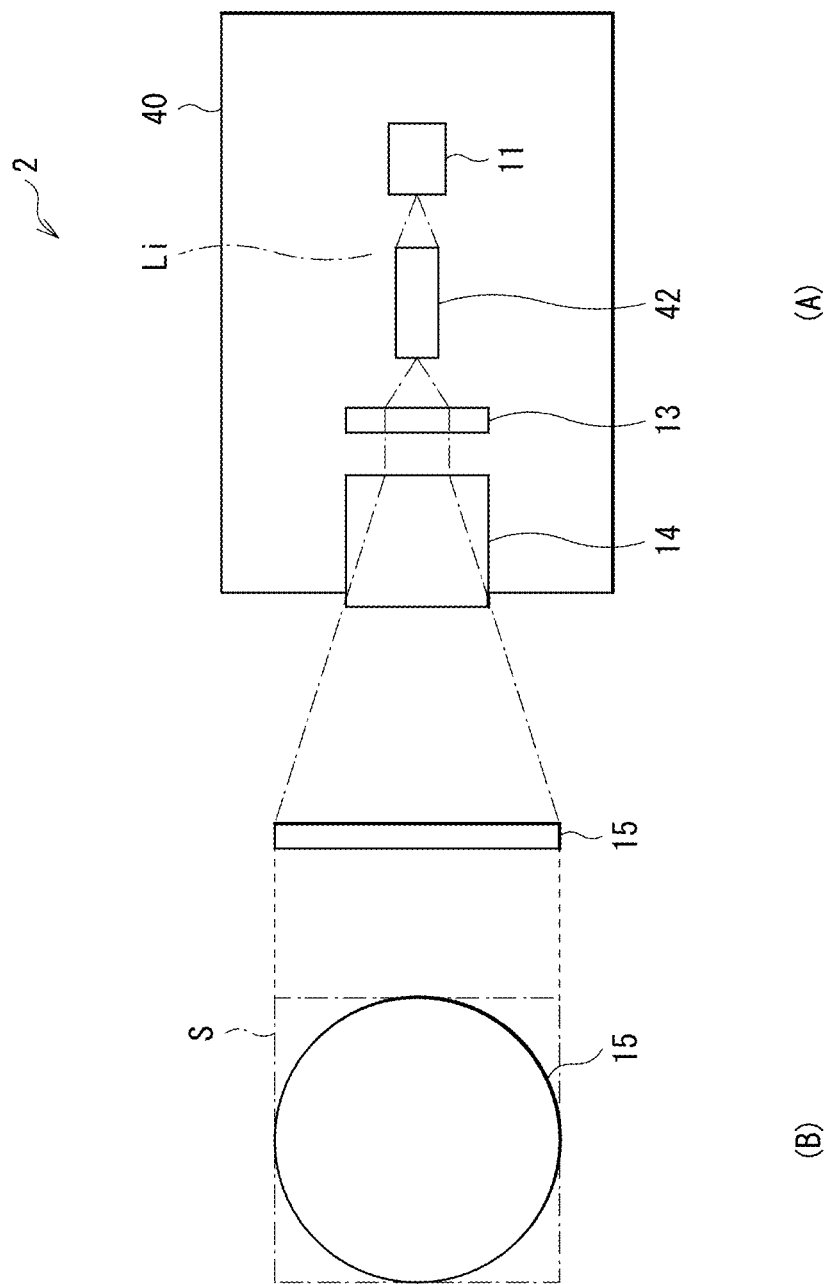
[FIG. 9]

[FIG. 10]
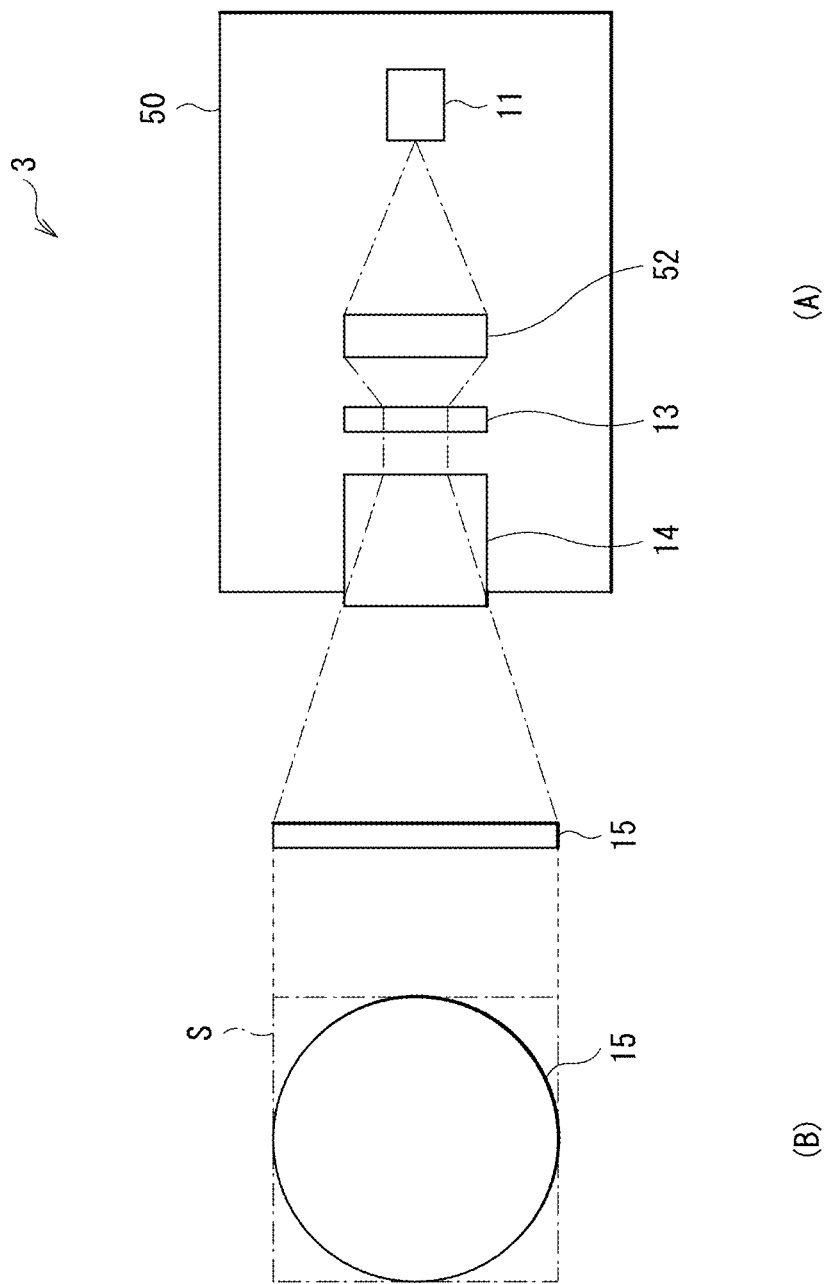

[FIG. 11]
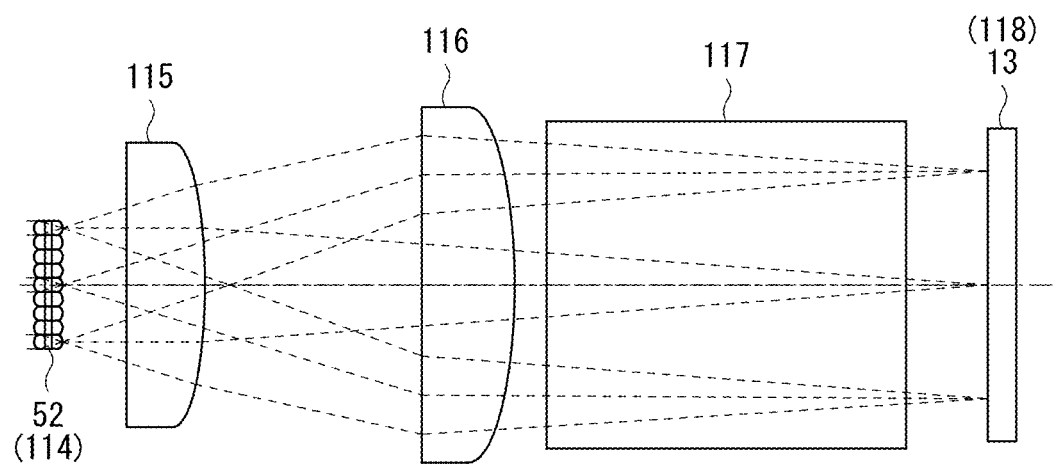
[FIG. 12]
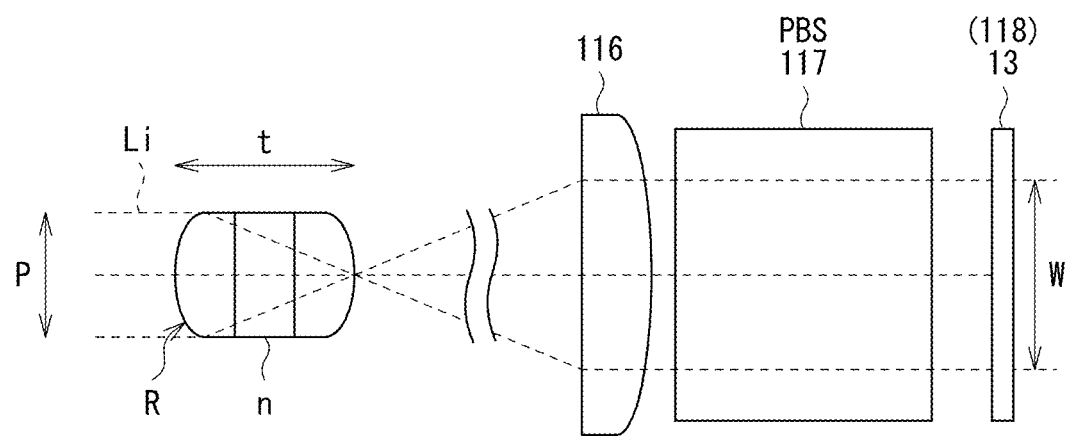

[FIG. 13]
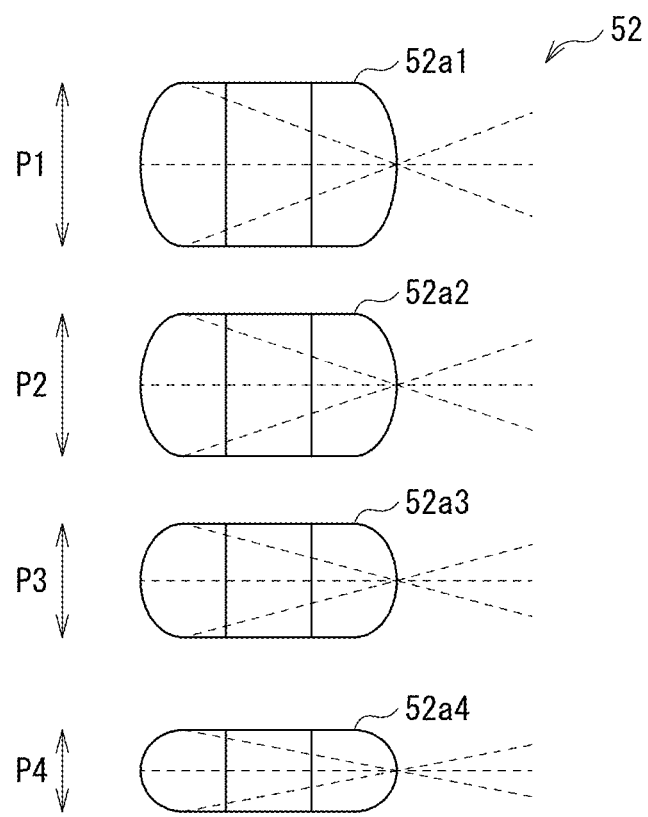

[FIG. 14A]
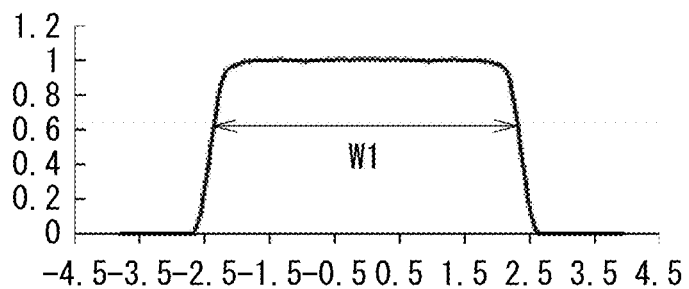
[FIG. 14B]
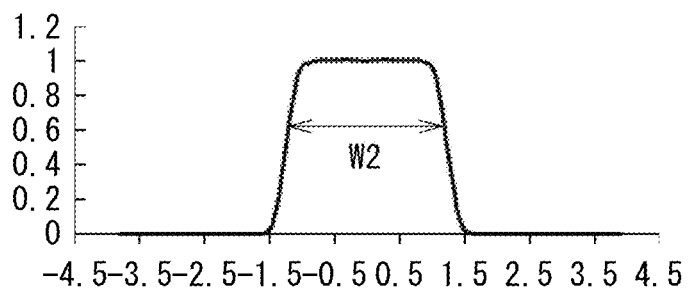
[FIG. 14C]
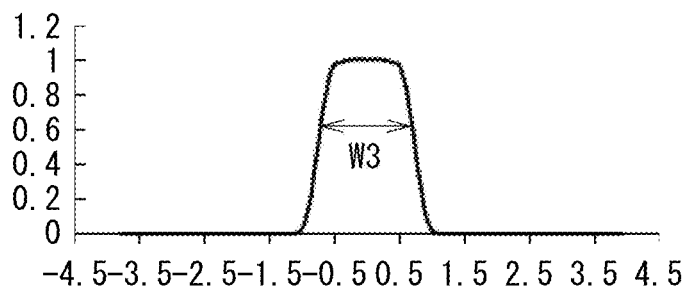
[FIG. 14D]
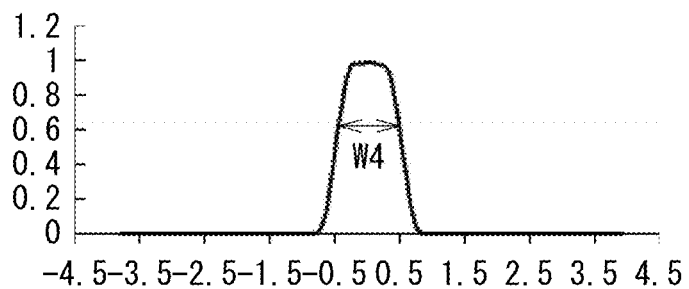

[FIG. 15]
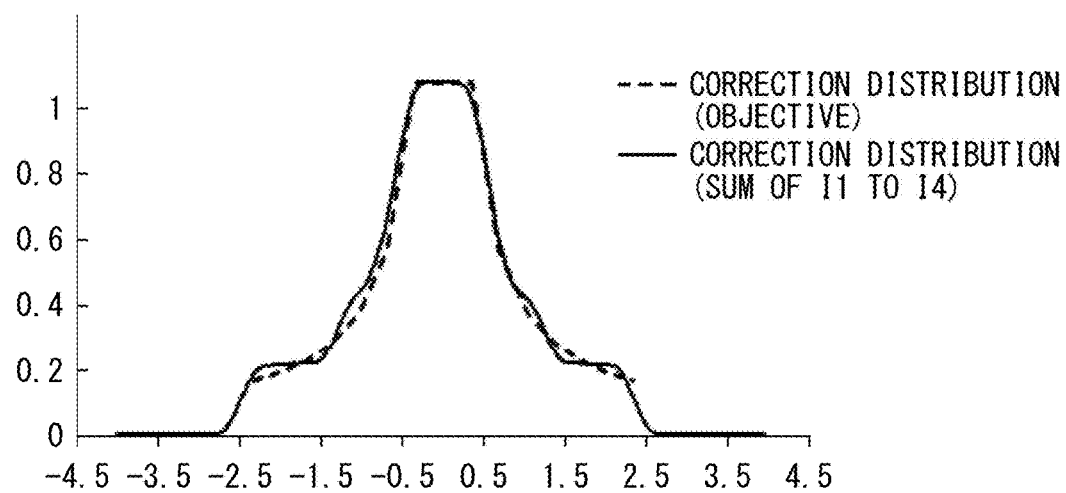
[FIG. 16]
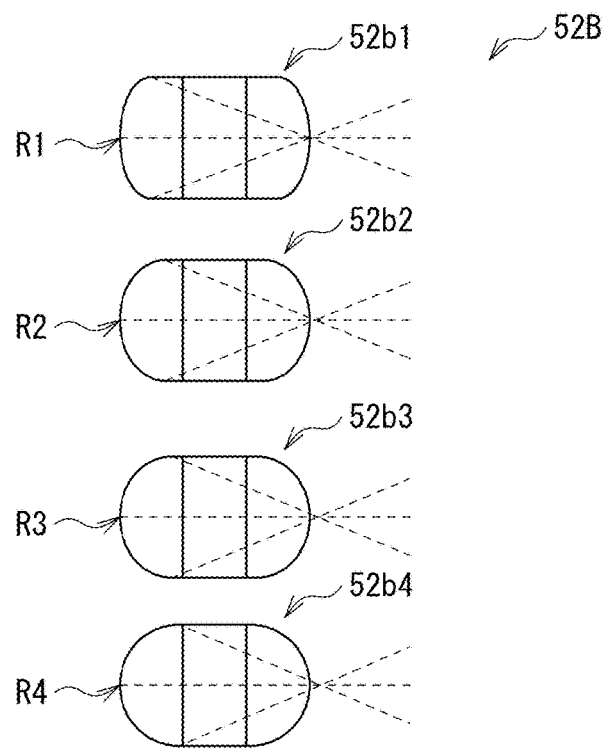

[FIG. 17]
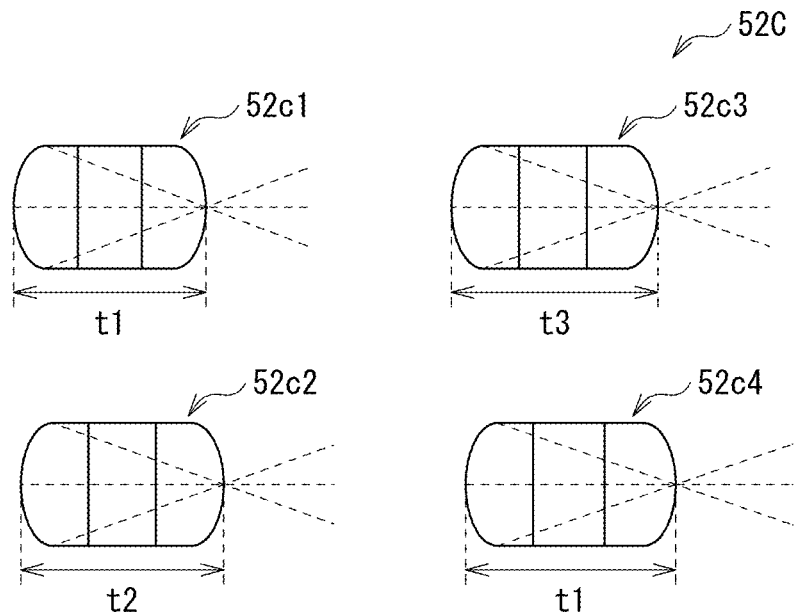
[FIG. 18]
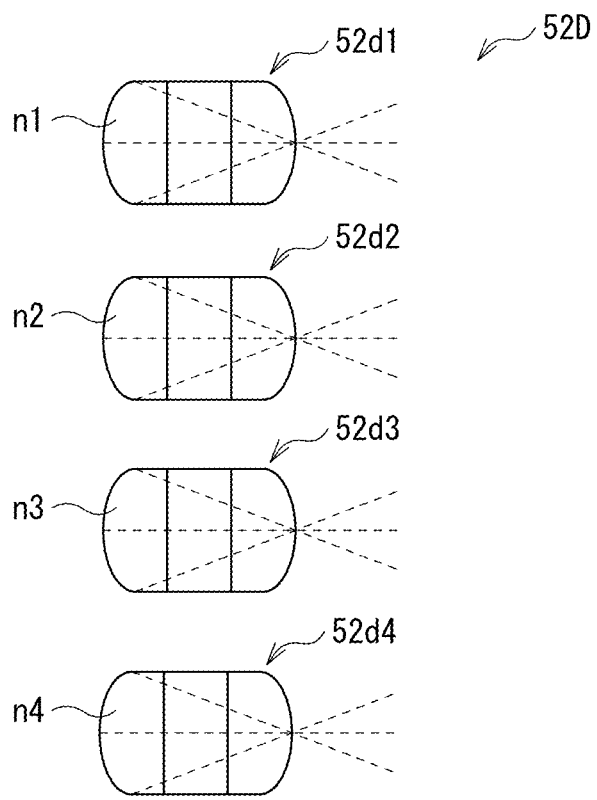

[FIG. 19A]
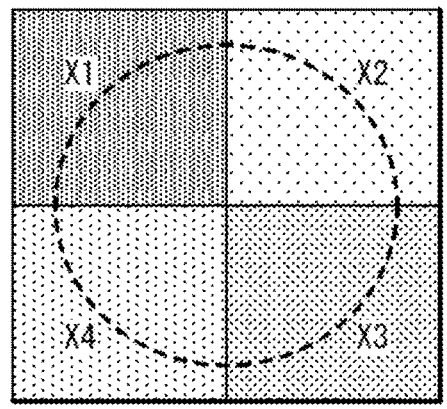
[FIG. 19B]
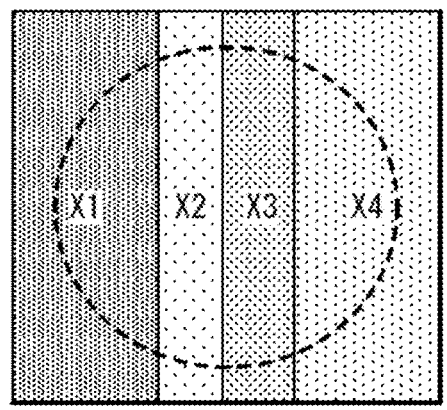
[FIG. 19C]
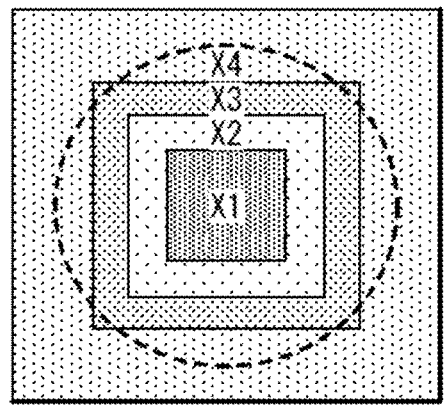

[FIG. 20]
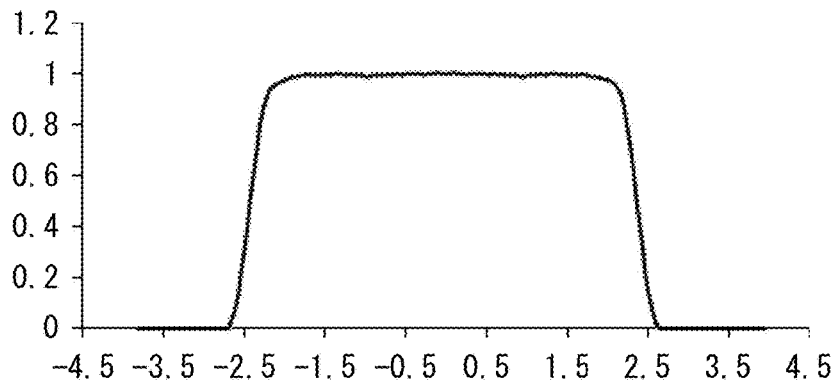
[FIG. 21]
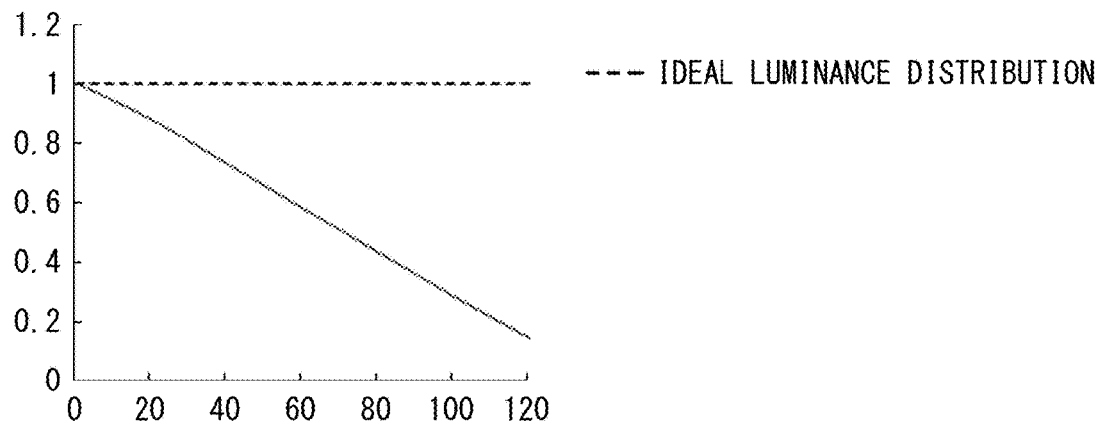
[FIG. 22]
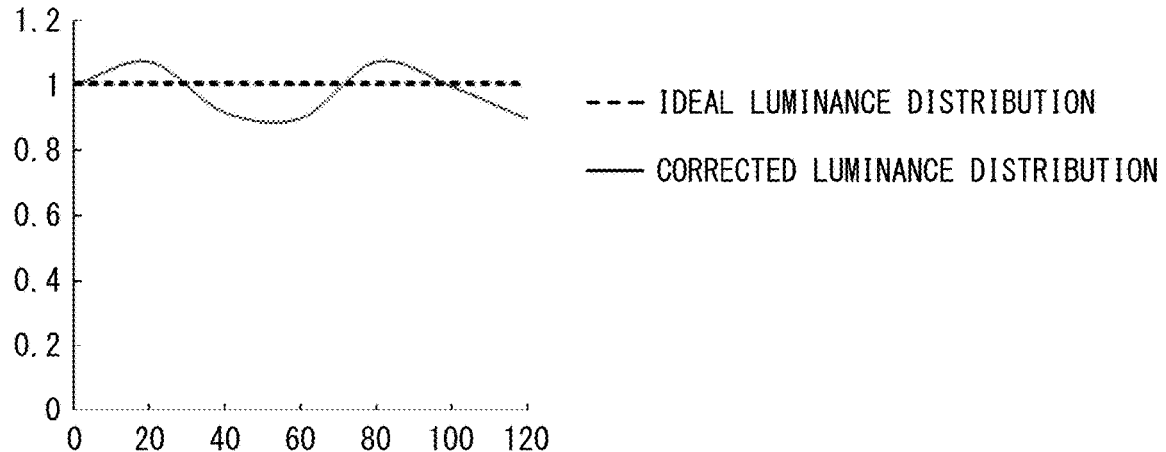

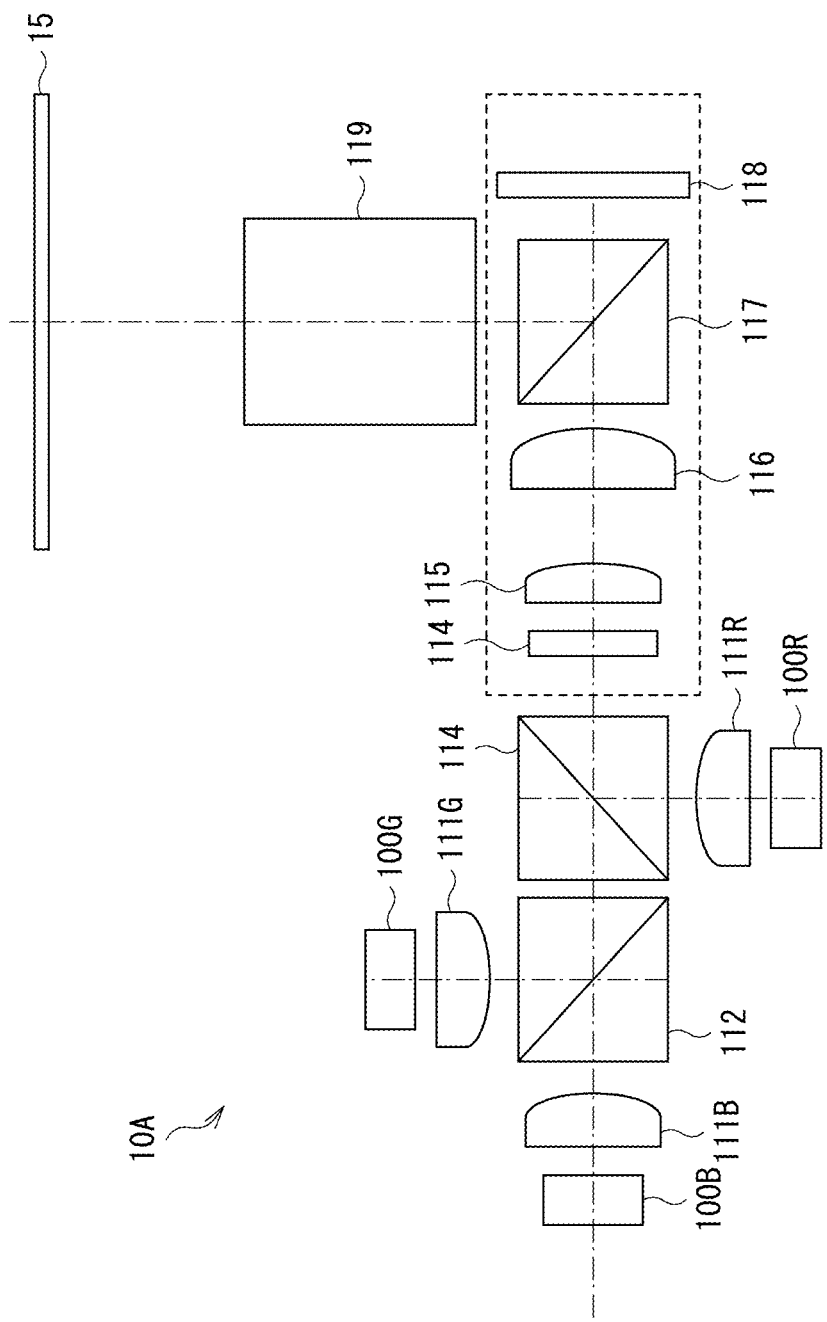
[FIG. 23]

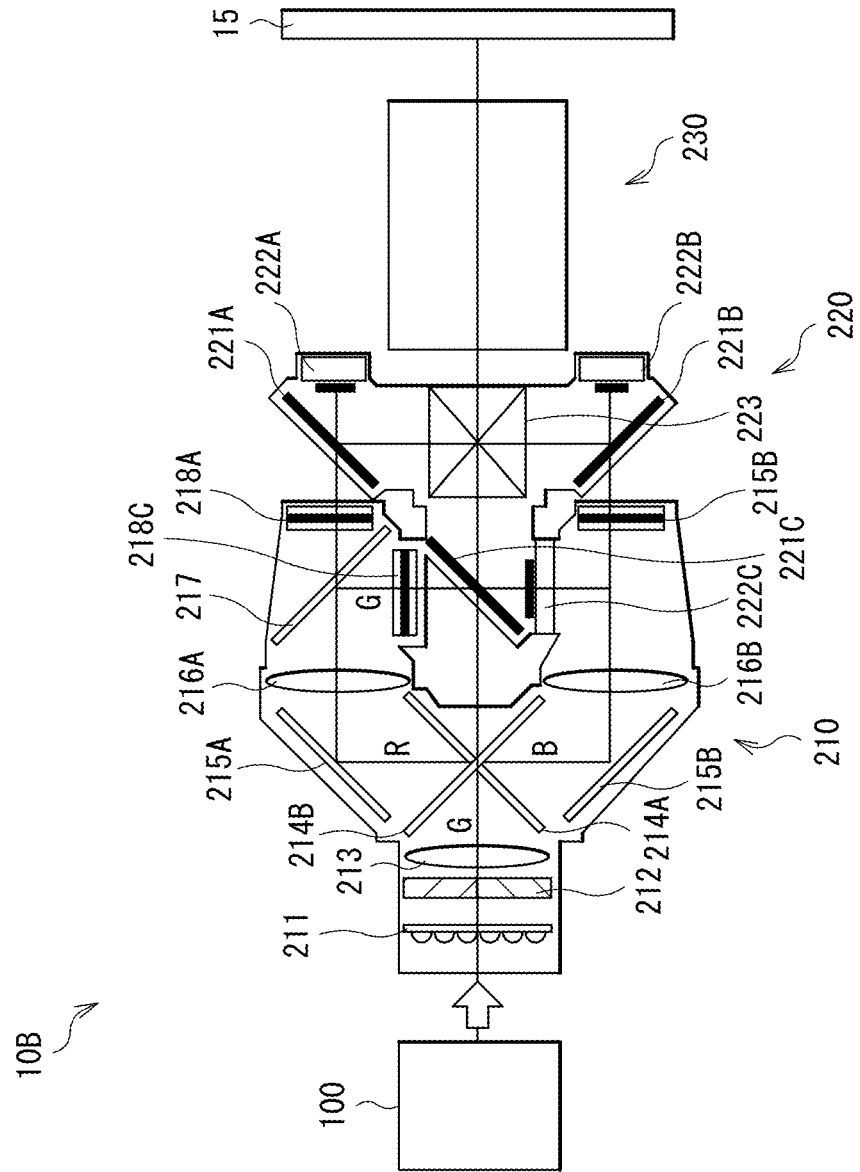
[FIG. 24]

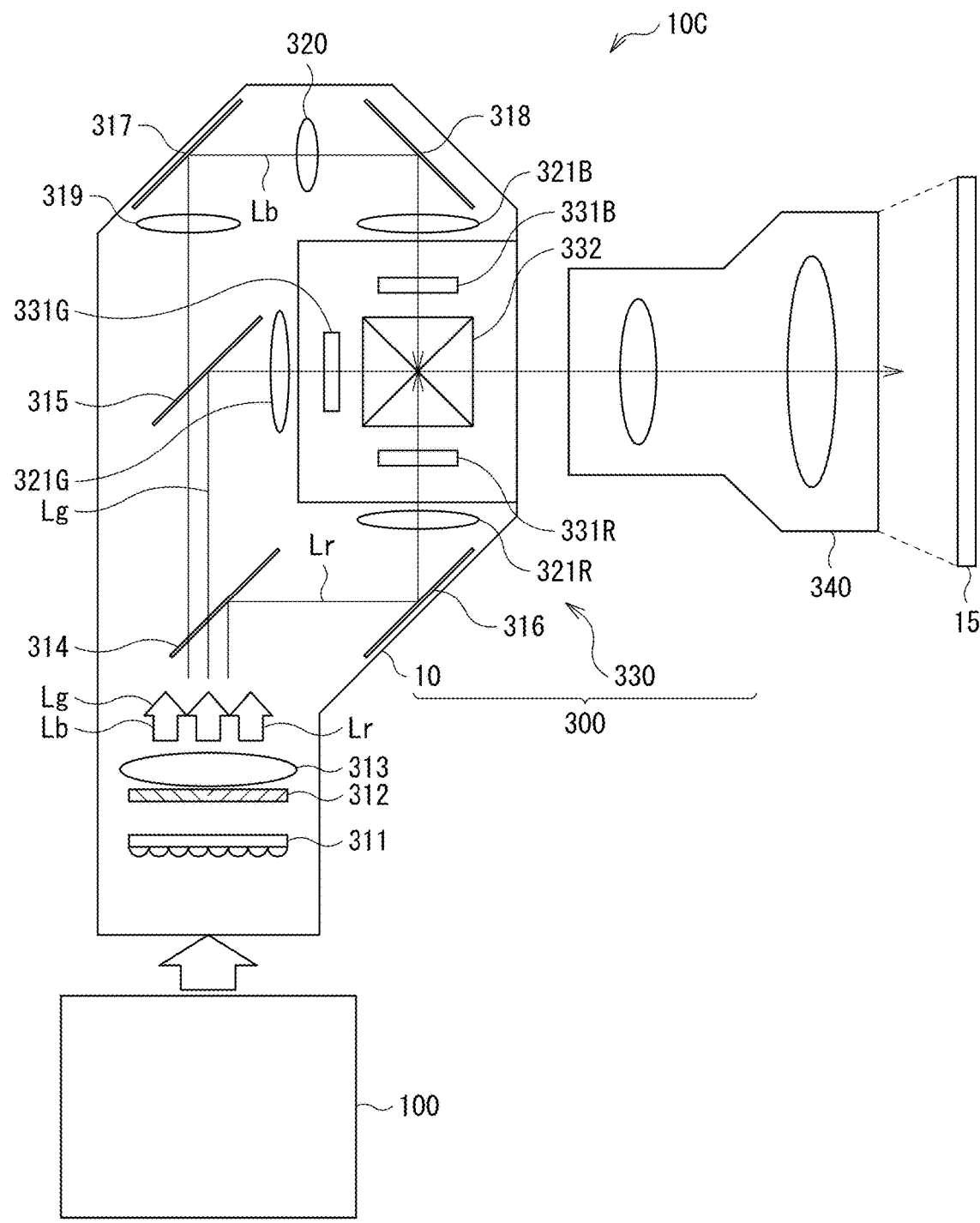
[FIG. 25]

[FIG. 26]
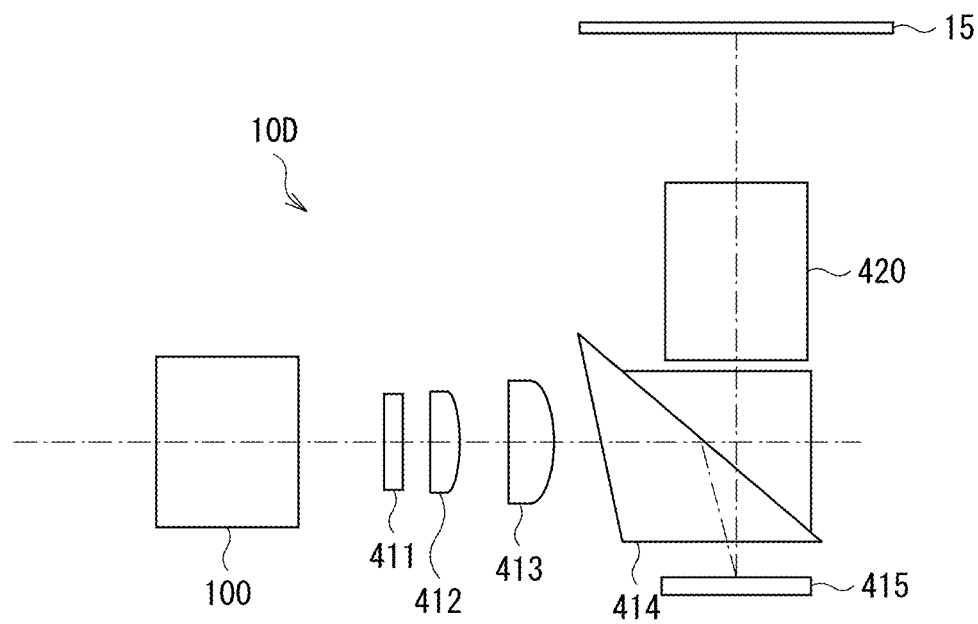

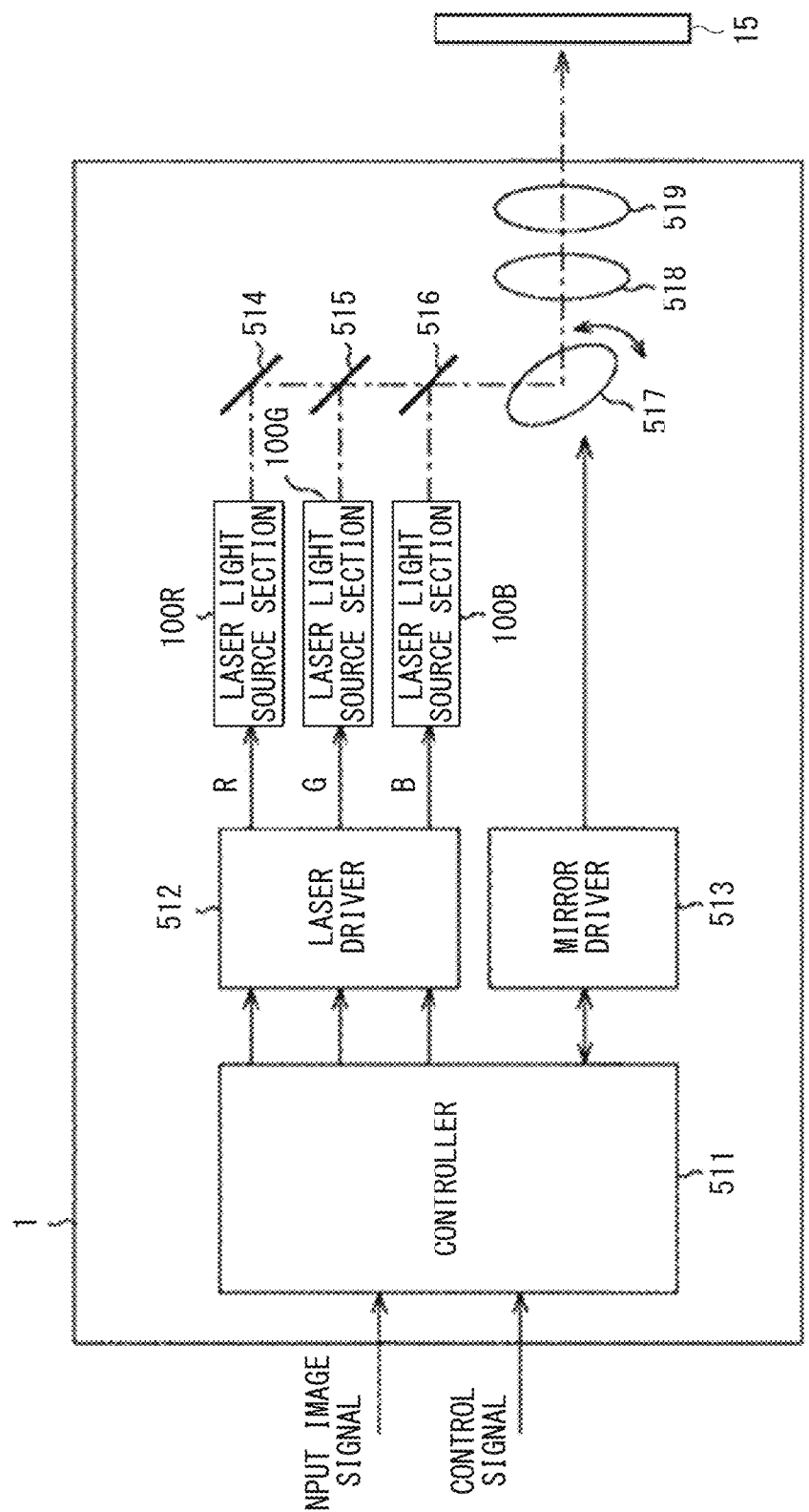
[FIG. 27]

IMAGE DISPLAY APPARATUS

CROSS REFERENCE TO RELATED APPLICATIONS

This application is a U.S. National Phase of International Patent Application No. PCT/JP2020/016376 filed on Apr. 14, 2020, which claims priority benefit of Japanese Patent Application No. JP 2019-086535 filed in the Japan Patent Office on Apr. 26, 2019. Each of the above-referenced applications is hereby incorporated herein by reference in its entirety.

TECHNICAL FIELD

The present disclosure relates to an image display apparatus that displays an image on a screen having a cylindrical shape, for example.

BACKGROUND

Recently, a technology has been developed for projecting images on screens or the like having various shapes. For example, PTL 1 discloses an image display apparatus that displays an image on a full-circumference screen or the like. In the image display apparatus of PTL1, an optical unit is disposed opposite to an output unit. The optical unit controls the incident angle of image light outputted from an output unit (output light (illumination light) outputted from a light source) with respect to an irradiation target object. Further, PTL 2, for example, discloses a projection-type image display apparatus using top-hat diffusion elements to improve the light utilization efficiency.

CITATION LIST

Patent Literature

[PTL 1] International Publication No. WO 2018/163945
[PTL 2] Japanese Unexamined Patent Application Publication No. 2017-142482

SUMMARY OF THE INVENTION

Meanwhile, an improvement in the image quality has been required in the image display apparatus described above.

It is desirable to provide an image display apparatus making it possible to improve the image quality.

An image display apparatus according to one embodiment of the present disclosure includes: an output unit including a light source and outputting projection light outputted from the light source along a predetermined axis; an irradiation target member to be irradiated with the projection light; a first optical member disposed opposite to the output unit along the predetermined axis and controlling an incident angle of the projection light to be incident on the irradiation target member; and a second optical member included in the output unit and adjusting the illumination range of the projection light to be incident on the first optical member such that the illumination range has an aspect ratio substantially the same as an aspect ratio of an outer shape of the first optical member.

The image display apparatus according to one embodiment of the present disclosure includes the second optical member in the output unit including the light source. The second optical member adjusts the illumination range of the projection light to be incident on the first optical member such that the illumination range has an aspect ratio substantially the same as an aspect ratio of an outer shape of the first optical member. This improves the utilization efficiency of the projection light.

BRIEF DESCRIPTION OF DRAWINGS

FIGS. 1A and 1B illustrate an exemplary schematic configuration of an output unit of an image display apparatus according to a first embodiment of the present disclosure in FIG. 1A, and the illumination range of image light outputted from the output unit in FIG. 1B.

FIG. 2 is a perspective view illustrating an exemplary external configuration of the image display apparatus including the output unit illustrated in FIGS. 1A and 1B.

FIG. 3 is a schematic cross-sectional view of the image display apparatus illustrated in FIG. 2.

FIG. 4 is a diagram illustrating a specific example of an illumination range control unit illustrated in FIGS. 1A and 1B.

FIG. 5 is a diagram illustrating the illumination range of image light passing through the illumination range control unit illustrated in FIG. 4.

FIG. 6 is a diagram illustrating a specific example of the illumination range control unit illustrated in FIGS. 1A and 1B.

FIG. 7 is a diagram illustrating the illumination range of image light passing through the illumination range control unit illustrated in FIG. 6.

FIGS. 8A and 8B illustrate a schematic configuration of an output unit of a typical image display apparatus of a comparative example in FIG. 8A, and the illumination range of image light outputted from the output unit in FIG. 8B.

FIGS. 9A and 9B illustrate an exemplary schematic configuration of an output unit of an image display apparatus according to a modification example of the present disclosure in FIG. 9A, and the illumination range of image light outputted from the output unit in FIG. 9B.

FIGS. 10A and 10B illustrate an exemplary schematic configuration of an output unit of an image display apparatus according to a second embodiment of the present disclosure in FIG. 10A, and the illumination range of image light outputted from the output unit in FIG. 10B.

FIG. 11 is a diagram illustrating an exemplary configuration of an optical system of the output unit.

FIG. 12 is a schematic diagram illustrating the relationship between each lens cell of a fly-eye lens and the illumination range.

FIG. 13 is a schematic cross-sectional view illustrating an exemplary configuration of each lens cell of the fly-eye lens used as an illumination control unit illustrated in FIGS. 10A and 10B.

FIG. 14A illustrates the illumination light intensity distribution of image light Li passing through the lens cell (a lens cell 52a) of the fly-eye lens illustrated in FIG. 13.

FIG. 14B illustrates the illumination light intensity distribution of image light Li passing through the lens cell (the lens cell 52a) of the fly-eye lens illustrated in FIG. 13.

FIG. 14C illustrates the illumination light intensity distribution of image light Li passing through the lens cell (the lens cell 52a) of the fly-eye lens illustrated in FIG. 13.

FIG. 14D illustrates the illumination light intensity distribution of image light Li passing through the lens cell (the lens cell 52a) of the fly-eye lens illustrated in FIG. 13.

FIG. 15 illustrates the sum of the illumination light intensity distributions with respect to the optical modulators illustrated in FIGS. 14A, 14B, 14C, and 14D.

FIG. 16 is a schematic cross-sectional view illustrating another exemplary configuration of each lens cell of a fly-eye lens used as the illumination range control unit illustrated in FIGS. 10A and 10B.

FIG. 17 is a schematic cross-sectional view illustrating another exemplary configuration of each lens cell of the fly-eye lens used as the illumination range control unit illustrated in FIGS. 10A and 10B.

FIG. 18 is a schematic cross-sectional view illustrating another exemplary configuration of each lens cell of the fly-eye lens used as the illumination range control unit illustrated in FIGS. 10A and 10B.

FIG. 19A is a diagram illustrating an exemplary arrangement of the respective lens cells of the fly-eye lens illustrated in, for example, FIG. 13.

FIG. 19B is a diagram illustrating an exemplary arrangement of the respective lens cells of the fly-eye lens illustrated in, for example, FIG. 13.

FIG. 19C is a diagram illustrating an exemplary arrangement of the respective lens cells of the fly-eye lens illustrated in, for example, FIG. 13.

FIG. 20 illustrates the illumination light intensity distribution of image light on an optical modulator in a typical image display apparatus.

FIG. 21 is a diagram illustrating the relationship between the position of a screen and the luminance observed when the screen is irradiated with image light having the illumination distribution illustrated in FIG. 20.

FIG. 22 is a diagram illustrating the relationship between the position of the screen and the luminance observed when the screen is irradiated with image light having the illumination distribution illustrated in FIG. 15.

FIG. 23 is a schematic diagram illustrating an exemplary configuration of the optical system in the image display apparatus illustrated in, for example, FIGS. 1A and 1B.

FIG. 24 is a schematic diagram illustrating another exemplary configuration of the optical system in the image display apparatus illustrated in, for example, FIGS. 1A and 1B.

FIG. 25 is a schematic diagram illustrating another exemplary configuration of the optical system in the image display apparatus illustrated in, for example, FIGS. 1A and 1B.

FIG. 26 is a schematic diagram illustrating another exemplary configuration of the optical system in the image display apparatus illustrated in, for example, FIGS. 1A and 1B.

FIG. 27 is a block diagram illustrating another exemplary configuration of the image display apparatus illustrated in, for example, FIGS. 1A and 1B.

MODES FOR CARRYING OUT THE INVENTION

Hereinafter, embodiments of the present disclosure are described in detail with reference to the accompanying drawings. The following description is a specific example of the present disclosure, and the present disclosure is not limited to the following embodiments. Further, the present disclosure is not limited to the arrangement, the dimensions, the dimension ratio, and the like of each component illustrated in the respective drawings. Note that the order of the description is as follows.

1. First Embodiment (Example of Image Display Apparatus Including Illumination Range Control Unit in Output unit)
   1-1. Configuration of Image Display Apparatus
   1-2. Operation of Image Display Apparatus
   1-3. Workings and Effects
2. Modification Example (Example Using Rod Integrator Lens as Illumination Range Control Unit)
3. Second Embodiment (Example of Image Display Apparatus Including Illumination Range Control Unit Having Function of Controlling Intensity Distribution in Emission Unit)
   3-1. Configuration of Image Display Apparatus
   3-2. Workings and Effects
4. Example of Optical System of Image Display Apparatus <1. First Embodiment>

FIG. 1A illustrates an exemplary schematic configuration of a main part (an output unit 10) of an image display apparatus according to a first embodiment of the present disclosure (an image display apparatus 1). FIG. 1B illustrates the illumination range S of image light Li outputted from the output unit 10 to a reflection mirror 15. FIG. 2 is a perspective view illustrating an external configuration of the image display apparatus 1. FIG. 3 schematically illustrates a cross-sectional configuration of the image display apparatus 1 taken along the line I-I in FIG. 2. The image display apparatus 1 is capable of displaying an image on a full-circumference screen having a rotation body shape, for example.

(1-1. Configuration of Image Display Apparatus)

The image display apparatus 1 of the present embodiment includes the output unit 10 including a light source 11, an illumination range control unit 12, an optical modulator 13, and a projector lens 14. The image display apparatus 1 also has a cylindrical shape and includes a pedestal 31, a screen 20, and a top plate 32. The output unit 10 is disposed on the pedestal 31. The reflection mirror 15 reflecting the image light Li outputted from the output unit 10 toward the screen is installed on the top plate 32. The output unit 10 emits the image light Li along a predetermined axis (e.g., an axis J10). The output unit 10 and the reflection mirror 15 are arranged opposite to each other about the axis J10. The screen 20 is disposed over the entire circumference around the axis J10, for example.

In the output unit 10 of the present embodiment, the illumination range control unit 12, the optical modulator 13, and the projector lens 14 are arranged in this order on the optical path of the output light outputted from the light source 11 (hereinafter, referred to as image light Li for convenience), for example. The illumination range control unit 12 adjusts the illumination rage of the image light Li outputted from the light source 11 such that the illumination range has an aspect ratio substantially the same as the aspect ratio of the outer shape of the reflection mirror 15. The reflection mirror 15 corresponds to a specific example of a "first optical member" of the present disclosure, and the illumination range control unit 12 corresponds to a specific example of a "second optical member" of the present disclosure.

The output unit 10 includes the light source 11, the illumination range control unit 12, the optical modulator 13, and the projector lens 14, as described above, and outputs the image light Li radially toward the reflection mirror 15. Note that the image light Li constitutes an image including a moving image and a still image. The image light Li corresponds to "projection light" of the present disclosure.

The output unit 10 is installed upward at a position substantially at the center of the pedestal 31, for example. Thus, the image light Li is outputted radially along a predetermined axis (the axis J10) extending in a Y-axis direction.

The output unit 10 is configured by, for example, a laser scanning color projector or the like that scans laser beams corresponding to respective colors RGB and displays respective pixels. Alternatively, the output unit 10 may be configured by any projector capable of projecting the image light Li. For example, a small mobile projector (pico-projector), a projector using a monochromatic laser beam, or the like may be appropriately used as the output unit 10 depending on the size and application of the image display apparatus 1. Note that an exemplary configuration of the optical system of the output unit 10 will be described later with reference to FIGS. 23 to 27.

The light source 11 may be, for example, a solid-state light source, such as a semiconductor laser (LD) or a light emitting diode (LED), a halogen lamp, a metal halide lamp, a xenon lamp, or the like.

The illumination range control unit 12 adjusts the illumination range S of the image light Li to be incident on the reflection mirror 15 such that the illumination range has an aspect ratio substantially the same as the aspect ratio of the outer shape of the reflection mirror 15, as described above. It is sufficient that the illumination range control unit 12 has a shape having substantially the same aspect ratio as the aspect ratio of the reflection mirror 15. For example, in a case where the reflection mirror 15 has an aspect ratio of 1:1, it is preferable to use a fly-eye lens 12A including a square lens cell of x1:x2=1:1 illustrated in FIG. 4 as the illumination range control unit 12. Accordingly, the image light Li projected from the output unit 10 to the reflection mirror 15 has a substantially square shape having substantially the same aspect ratio as that of the outer shape of the reflection mirror 15. That is, as illustrated in FIG. 5, the peripheral portion of the illumination range S of the image light Li incident on the reflection mirror 15 is brought into close contact with four points (A1, A2, A3, and A4) on the circumference of the reflection mirror by adjusting the projection distance using, for example, the projector lens 14 or the like. This improves the illumination efficiency of the image light Li outputted from the light source 11 to the reflection mirror 15.

Note that it is sufficient that the outer shape of the lens cell of the fly-eye lens used as the illumination range control unit 12 has an aspect ratio substantially the same as the aspect ratio of the reflection mirror 15. Further, any number of vertical arrays and horizontal arrays of the lens cells may be arranged in the fly-eye lens. Generally, the more arrays are arranged, the more the uniformity of the illumination light is improved. Thus, although the fly-eye lens 12A having 3×4 arrays including twelve lens cells 12a is illustrated in FIG. 4, the number of lens cell arrays is not limited thereto. For example, a fly-eye lens having 5×6 arrays including, for example, thirty lens cells may be used as the illumination range control unit 12. Alternatively, a fly-eye lens having vertical and horizontal arrays in the same number, for example, 4×4 arrays including sixteen lens cells may be used as the illumination range control unit 12.

Further, although the fly-eye lens 12A including the lens cells 12a each having a square shape is illustrated in FIG. 4, the outer shapes of the lens cells of the fly-eye lens are not limited thereto. For example, as illustrated in FIG. 6, a fly-eye lens 12B including lens cells 12b each having a substantially regular hexagonal outer shape may be used as the illumination range control unit 12. In a case where the fly-eye lens 12B is used, the illumination range S has a substantially regular hexagonal shape, and the peripheral portion of the illumination range S of the image light Li incident on the reflection mirror 15 is in close contact with six points (B1, B2, B3, B4, B5, and B6) on the circumference of the reflection mirror 15, as illustrated in, for example, FIG. 7.

Note that the shape of each lens cell (e.g., the lens cell 12a) of the fly-eye lens used as the illumination range control unit 12 is not limited to a substantially rectangular shape or a substantially hexagonal shape. Each lens cell may have a pentagonal, heptagonal, or higher polygonal shape.

The optical modulator 13 performs spatial modulation of the image light Li (or RGB color light components of the image light Li). For example, the optical modulator 13 may be a reflective liquid crystal panel called a transmissive liquid crystal panel or a liquid crystal on silicon (LCOS). Note that, in place of the optical modulator 13, a digital micromirror device (DMD) or a micro electromechanical system (MEMS) mirror may be used as the first optical member.

The projector lens 14 enlarges and projects the image light Li to the reflection mirror 15.

The reflection mirror 15 has a reflection surface (a surface 15S) that reflects the image light Li outputted from the output unit 10. The reflection mirror 15 controls the incident angle of the image light Li outputted from the output unit 10 to the screen 20. Specifically, the reflection mirror 15 controls the incident angle of the image light Li with respect to the screen 20 to be substantially constant. Note that the substantially constant incident angle includes an incident angle within an angle range (allowable angle range) in which image displaying is properly performed. The allowable angle range is determined depending on the diffraction property of a transmissive diffuser HOE used as the irradiation target member 22, for example. Thus, the image light Li radially outputted from the output unit 10 is outputted in the form of substantially parallel light toward the screen 20.

The reflection mirror 15 has the reflection surface (the surface 15S) having a rotationally symmetrical shape about the axis J10. The reflection mirror 15 is disposed opposite to the output unit 10 with respect to the axis J10 such that the reflection surface (the surface 15S) faces the output unit 10. For instance, the reflection surface (the surface 15S) of the reflection mirror 15 is a rotation surface formed by rotating a curved line partially cut from a parabola about the axis J10. The rotation surface is formed such that an concave side of the parabola (a focal side of the parabola) serves as a light reflection side (the reflection surface (the surface 15S)) and that the axis of the parabola differs from the axis J10, for example. Further, the reflection surface (the surface 15S) has a shape having a vertex on the axis J10. That is, the reflection surface (the surface 15S) has a convex shape at the intersection between the rotation surface and the axis J10 when viewed from the output unit 10. Further, the cross-sectional shapes of the left and right portions of the reflection mirror 15 across the axis J10 are concave parabolic shapes when viewed from the output unit 10.

Examples of the material of the reflection mirror 15 include resin such as acrylic, glass, and metal. The reflection mirror 15 is formed by, for example, conducting mirror finishing on a surface of the material described above such that the surface roughness Ra is less than about 0.1 μm. Further, the reflection surface (the surface 15S) of the reflection mirror 15 may be subjected to high-reflectance coating using aluminum (Al), silver (Ag), or the like. This makes it possible to reflect the image light Li incident on the reflection surface (the surface 15S) with high efficiency. Further, the front face of the reflection surface (the surface 15S) may be subjected to protective coating using a silicon oxide ($SiO_2$) film, a polymerized film, or the like.

Note that the material of the reflection mirror 15 is not limited to the above-described materials, and any material may be used depending on machining accuracy, productivity, and the like. Further, the materials used in the high reflectance coating and the protective coating is not limited to particular materials.

The screen 20 has a cylindrical shape and is disposed over, for example, the entire circumference around the axis J10, as described above. The screen 20 includes, for example, a support member 21 and the irradiation target member 22. Further, the screen 20 having a cylindrical shape is disposed such that its central axis is substantially aligned with the axis J10 of the output unit 10. Note that the screen 20 exemplified in FIGS. 2 and 3 has the same diameter as the pedestal 31; however, this is non-limiting. The diameter and the height of the screen 20 may be determined as appropriate.

The support member 21 supports the irradiation target member 22. The support member 21 may be configured by, for example, an optical transparent base. Examples of the base include a plastic material, such as an acrylic resin or a polycarbonate resin, glass, or the like.

The irradiation target member 22 diffuses the image light Li reflected from the reflection mirror 15 toward the outside of the image display apparatus 1. The irradiation target member 22 is configured by, for example, a diffractive optical element, specifically, a holographic optical element (HOE). The HOE is an optical elements that diffracts only light having a particular wavelength and transmit remaining light in a selective manner based on the incident angle. The irradiation target member 22 is configured by, for example, a transmissive diffuser HOE. Thus, the image light Li reflected from the reflection mirror 15 and incident on the transmissive diffuser HOE (the irradiation target member 22) from the inside of the image display apparatus 1 is diffused (scattered) in various directions and outputted to the outside of the image display apparatus 1. FIG. 3 schematically illustrates the state of the image light Li being incident on the transmissive diffuser HOE (the irradiation target member 22), being diffused (scattered), and being outputted to the outside.

The HOE exhibits the maximum diffraction efficiency when light having the same wavelength as the wavelength of reference light for exposure in the manufacture process is used as reproduction illumination light at an incident angle substantially the same as that of the reference light. That is, in the fabrication process of the transmissive diffuser HOE, for example, green light having a wavelength of about 530 nm is emitted as object light or reference light to a first surface of a photopolymer at an incident angle of about 40°. Reproduction light outputted vertically from a second surface of the transmissive diffuser HOE obtained thereby has a maximum intensity (luminance) when reproduction illumination light is incident on the first surface at an incident angle of 40°. Additionally, light having a wavelength different from that of the reference light used for the exposure (e.g., red light having a wavelength of 630 nm and blue light having a wavelength of 455 nm) has the maximum diffraction efficiency when the incident angle of the reference light is 40°.

As described above, the image light Li is incident on at a constant incident angle depending on the incident angle of the reference light used for the exposure of the transmissive diffuser HOE. This makes it possible to increase the luminance of the image display apparatus 1. Note that the incident angles of the object light and the reference light for the exposure of the transmissive diffuser HOE are not limited to the above-described examples, and may be appropriately determined depending on the application of the image display apparatus 1 or the properties of the transmissive diffuser HOE. The incident angle of the image light Li with respect to the irradiation target member 22 is preferably 40° or greater and 75° or less, for example. This makes it possible to secure the size of an image to be projected to the screen.

The HOE used as the irradiation target member 22 may be a volume type HOE that records an interference fringe by exposing a photosensitive material, or a surface-relief HOE that produces an interference fringe using an uneven shape of the material surface. Alternatively, in place of the transmissive diffuser HOE, a reflective HOE may be used as the irradiation target member 22.

Note that the screen 20 is not limited to the configuration described above. For example, the support member 21 may also serve as the irradiation target member 22. Further, the screen 20 may include, for example, an additional transmissive diffuser HOE or a combination of a reflective mirror HOE and a reflective diffuser HOE. In that case, it is preferable to arrange the HOE at a position after the irradiation target member 22 on the optical path of the image light Li. This reduces the amount of light leaking through the screen 20, and improves the transparency and image quality (image contrast) of the screen 20.

Alternatively, a Fresnel screen may be used as the screen 20. This improves the luminance compared with the screen 20 configured by the HOE. Alternatively, a scattering particle screen may be used as the screen 20. This reduces the cost compared with the screen 20 configured by the HOE, and allows the image display apparatus 1 to have a large size.

The pedestal 31 holds, for example, the output unit 10, the screen 20, and the top plate 32. For instance, the pedestal 31 is disposed below the image display apparatus 1. The output unit 10, the screen 20, and the top plate 32 are held by any non-illustrated holding mechanism. For example, a partition plate 33 is disposed between the pedestal 31 and the screen 20. Further, although not illustrated, a power supply source such as a battery, a speaker, devices used to operate the image display apparatus 1, and the like are arranged on the pedestal 31 in an appropriate manner. The shape or the like of the pedestal 31 is not limited. For example, although FIGS. 1A and 1B illustrates the pedestal 31 having a cylindrical shape, any shape such as a rectangular parallelepiped shape may be selected.

The top plate 32 holds the reflection mirror 15. For example, the top plate 32 is disposed above the image display apparatus 1.

The partition plate 33 partitions the interior space of the pedestal 31 in which the output unit 10 is disposed and the interior space of the screen 20, for example. The partition plate 33 is provided with an opening 33H at a position facing the output unit 10 so as not to hinder emission of the image light Li from the output unit 10 to the reflection mirror 30. It is preferable that partition plate 33 include a material having a reflectance of, for example, 50% or less. This reduces the projection intensity of the image on the partition plate 33 when the image light Li is reflected from the inside of the screen 20, for example.

(1-2. Operation of Image Display Apparatus)

In the image display apparatus 1, the illumination range control unit 12, the optical modulator 13, and the projector lens 14 are arranged in this order on the optical path of the image light Li outputted from the light source 11. The image light Li is adjusted by the illumination range control unit 12 such that the cross-sectional shape of the light beam of the image light Li has an aspect ratio substantially the same as, for example, the aspect ratio of the outer shape of the reflection mirror 15 before being outputted toward the optical modulator 13. The image light Li outputted from the illumination range control unit 12 passes through the optical modulator 13 and the projector lens 14 in this order, and is outputted radially along the axis J10 from the projector lens 14 toward the reflection mirror 15. The image light Li is radially reflected from the reflection surface 15S of the reflection mirror 15 toward the entire circumference of the screen 20, and enters the screen 20 at a substantially constant incident angle. The image light Li incident on the screen 20 is diffracted by the irradiation target member 22 and diffused before being outputted to the outside of the image display apparatus 1, whereby an image such as a full circumference image is displayed on the outside of the screen 20

(1-3. Workings and Effects)

The image display apparatus 1 includes the output unit 10, the screen 20, and the reflection mirror 15. The output unit 10 outputs the image light Li along a predetermined axis (the axis J10). The screen 20 is irradiated with the image light Li. The reflection mirror 15 is disposed opposite to the output unit 10 along the axis J10, and emits the image light Li to the screen 20 at a predetermined angle. In the present embodiment, the illumination range control unit 12 is disposed in the output unit 10 and adjusts the illumination range S of the image light Li outputted from the light source 11 to the reflection mirror 15 such that the illumination range S has an aspect ratio substantially the same as the aspect ratio of the outer shape of the reflection mirror 15. This improves the illumination efficiency of the reflection mirror 15.

FIG. 8A illustrates an exemplary schematic configuration of a typical output unit (an output unit 1000) in an image display apparatus that displays an image on a full-circumference screen as described above, and FIG. 8B illustrates an illumination range S1000 (B) of image light Li1000 outputted from the output unit 1000 to a reflection mirror 1500. In the typical image display apparatus, a fly-eye lens 1200, an optical modulator 1300 and a projector lens 1400 are arranged in this order on the optical path of the image light Li1000 outputted from a light source 1100. The image light Li1000 incident on the projector lens 1400 is radially outputted from the projector lens 1400 toward the reflection mirror 1500. In such an image display apparatus, the fly-eye lens 1200 is used to uniformize the brightness of the image light Li1000.

For the image display apparatus that displays an image on a full-circumference screen, image light needs to be emitted to only the reflection mirror. Thus, the display area is controlled by a video signal. As illustrated in FIGS. 8A and 8B, such an image display apparatus generates a loss of brightness corresponding to illumination light incident on the optical modulator 1300 but not on the reflection mirror 1500, i.e., the image light Li1000 incident on the outside of the reflection mirror 1500. As a result, the efficiency of illumination to the full circumference screen is deteriorated, resulting in deterioration of the image quality.

In contrast, the image display apparatus 1 of the present embodiment includes the illumination range control unit 12 arranged on the optical path of image light Li outputted from the light source 11, and the illumination range S of the image light Li outputted from the light source 11 to the reflection mirror 15 is adjusted such that the illumination range S has an aspect ratio substantially the same as the aspect ratio of the outer shape of the reflection mirror 15, whereby the image light Li is outputted toward the optical modulator 13, for example. The illumination range control unit 12 includes, for example, a fly-eye lens (e.g., the fly-eye lens 12A or 12B) having an outer shape with the aspect ratio substantially the same as the aspect ratio of the outer shape of the reflection mirror 15. This reduces the proportion of the image light Li outputted from the output unit 10 to the outside of the reflection mirror 15 in the illumination range S. This improves the illumination efficiency of the image light Li.

As described above, in the image display apparatus 1 of the present embodiment, the illumination range control unit 12 is arranged in the output unit 10, and the illumination range S of the image light Li to be incident on the reflection mirror 15 is adjusted such that the illumination range S has an aspect ratio substantially the same as the aspect ratio of the outer shape of the reflection mirror 15 before being outputted to the optical modulator 13. This improves the illumination efficiency of the image light Li and the image quality.

Described next is a second embodiment and a modification example of the present disclosure. Hereinafter, the same reference numerals are used for the same components as those in the above-described embodiments, and the description thereof is omitted as appropriate.

<2. Modification Example>

FIG. 9A illustrates an exemplary schematic configuration of a main part (an output unit 40) of an image display apparatus according to a modification example of the present disclosure (an image display apparatus 2). FIG. 9B illustrates the illumination range S of image light Li outputted from the output unit 40 to the reflection mirror 15. The image display apparatus 2 is capable of displaying an image on a full-circumference screen having a rotation body shape, for example. The image display apparatus 2 according to the modification example is different from the image display apparatus according to the embodiment described above in that a rod integrator lens is used as the illumination range control unit 42.

The illumination range control unit 42, which adjusts the illumination range S of the image light Li to be incident on the reflection mirror 15 as described above, may be configured by a rod integrator lens having a cylindrical shape or a square or higher polygonal shape in place of the fly-eye lens 12A or 12B having substantially the same aspect ratio as the outer shape of the reflection mirror 15.

As described above, in the image display apparatus 2 of this modification example, the rod integrator lens having a cylindrical or square or higher polygonal shape and the aspect ratio substantially the same as the aspect ratio of the outer shape of the reflection mirror 15 is used as the illumination range control unit 42. Thus, the illumination range S of the image light Li incident on the reflection mirror 15 has an aspect ratio substantially the same as the aspect ratio of the reflection mirror 15. This reduces the proportion of the image light Li emitted to the outside of the outer shape of the reflection mirror 15. Accordingly, it is possible to obtain the same effects as those in the first embodiment described above.

In place of the rod integrator lens, a diffuser plate, a volume type HOE, a surface-relief HOE, or a MEMS mirror may be used as the illumination range control unit 42.

<3. Second Embodiment>

FIG. 10A illustrates an exemplary schematic configuration of a main part (an output unit 50) of an image display apparatus according to a second embodiment of the present disclosure (an image display apparatus 3). FIG. 10B illustrates the illumination range S of image light Li outputted from the output unit 50 to the reflection mirror 15. The image display apparatus 3 is capable of displaying an image on the full circumference screen having a rotation body shape, for example.

(3-1. Configuration of Image Display Apparatus)

In the image display apparatus 3 of the present embodiment, a fly-eye lens (e.g., a fly-eye lens 52A, 52B, 52C, or 52D) including a plurality of lenses different from each other in any one of the lens pitch (P), the radius of curvature (R), the on-axis thickness (t), and the refractive index (n) is used as an illumination range control unit 52. Thus, the illumination range S with respect to the reflection mirror 15 has an intensity distribution. For example, in the image display apparatus 3 of the present embodiment, the image light Li having a larger intensity distribution in its central portion than in its peripheral portion is projected to the reflection mirror 15. The present embodiment is different from the first embodiment described above in this regard.

FIG. 11 illustrates an exemplary optical system in a range from the illumination range control unit 52 (the fly-eye lens 114) to the optical modulator 13 (an LCOS 118) (see FIG. 23 for details). The image light Li incident on the illumination range control unit 52 enters the optical modulator 13 through, for example, a main condensing lens 115, a channel condensing lens 116, and a polarizing beam splitter (PBS) 117. FIG. 12 illustrates the relationship between one of the plurality of lens cells of the fly-eye lens used as the illumination range control unit 52 and the illumination range S of the image light Li incident on the optical modulator 13.

The relationship between the plurality of lens cells of the fly-eye lens and the illumination range (W) of the image light Li on the optical modulator 13 is represented by the following Expressions (1) to (3):

$$W = M \times P \quad \text{Expression (1)}$$

$$M = fc/f \quad \text{Expression (2)}$$

$$f = nR^2/(n-1)[2nR - t(n-1)] \quad \text{Expression (3)},$$

where M denotes the magnification, P denotes the lens pitch of the fly-eye lens, f denotes the focal length of the fly-eye lens, fc denotes the focal length of the condensing lens, R denotes the radius of curvature of the fly-eye lens, n denotes the material refractive index of the fly-eye lens, and t denotes the on-axis thickness.

It is apparent from Expressions (1) to (3) that it is possible for the fly-eye lens to set any illumination range (W) on the optical modulator 13 by changing at least one of the lens pitch (P), the radius of curvature (R), the on-axis thickness (t), and the material refractive index (n). For instance, when the on-axis thickness of the fly-eye lens (t) is increased, the focal length (f) is elongated and the magnification (M) is lowered. As a result, the illumination region (W) is narrowed. When the radius of curvature (R) of the fly-eye lens is increased, the focal length (f) is elongated and the magnification (M) is lowered. As a result, the illumination range (W) is narrowed. When the refractive index (n) of the fly-eye lens is reduced, the focal length (f) is elongated and the magnification (M) is lowered. As a result, the illumination range (W) is narrowed.

In the present embodiment, the fly-eye lens (the fly-eye lens 52A, 52B, 52C, or 52D) including four lens cells different from each other in any one of the lens pitch (P), the radius of curvature (R), the on-axis thickness (t), and the material refractive index (n) of the fly-eye lens is used as the illumination range control unit 52. FIG. 13 illustrates exemplary cross-sectional views of the four lens cells of the fly-eye lens 52A, namely, lens cells 51a1, 52a2, 52a3, and 52a4, and changes of the optical paths of light incident on the lens cells 51a1, 52a2, 52a3, and 52a4 (dashed lines). These lens cells 51a1, 52a2, 52a3, and 52a4 have respective lens pitches P1, P2, P3, and P4. These lens pitches have a magnitude relationship represented by P1>P2>P3>P4.

FIGS. 14A, 14B, 14C, and 14D illustrate the illumination light intensity distributions (I1 to I4) of light passing through the respective lens cell 51a1, 52a2, 52a3, and 52a4 on the optical modulator 13. As illustrated in FIGS. 14A, 14B, 14C, and 14D, the lens pitch (P) has a proportional relationship with the illumination range (W) on the optical modulator 13. For example, the illumination range (W) on the optical modulator 13 is narrowed by reducing the lens pitch (P). FIG. 15 illustrates a correction distribution (objective; dashed line) and the sum of the illumination light intensity distributions (I1 to I4) illustrated in FIGS. 14A, 14B, 14C, and 14D (solid line). Accordingly, the lens cells 51a1, 52a2, 52a3, and 52a4 having different lens pitches are appropriately arranged in the fly-eye lens such that the illumination ranges (W1, W2, W3, and W4) overlap each other. This allows the illumination range S on the optical modulator 13 to have a desired intensity distribution.

Note that the illumination light intensity distributions I1 to I4 illustrated in FIGS. 14A, 14B, 14C and 14D may be obtained by adjusting the radius of curvature (R), the on-axis thickness (t), or the material refractive index (n). FIG. 16 illustrates exemplary cross-sectional configurations of the four lens cells 51b1, 52b2, 52b3, and 52b4 of the fly-eye lens 52B, and changes of the optical paths of the light incident on the lens cells 51b1, 52b2, 52b3, and 52b4 (dashed lines). These lens cell 51b1, 52b2, 52b3, and 52b4 have respective radii of curvature R1, R2, R3, and R4. These radii of curvature have a magnitude relationship represented by R1>R2>R3>R4. FIG. 17 illustrates exemplary cross-sectional configurations of the four lens cells 51c1, 52c2, 52c3, and 53c4 of the fly-eye lens 52C, and changes of the optical paths of the light incident on the lens cells 51c1, 52c2, 52c3, and 53c4 (dashed lines). These lens cells 51c1, 52c2, 52c3, and 52c4 have respective on-axis thicknesses t1, t2, t3, and t4. These on-axis thicknesses have a magnitude relationship represented by t1>t2>t3>t4. FIG. 18 illustrates exemplary cross-sectional configurations of the four lens cells 51d1, 52d2, 52d3, and 52d4 of the fly-eye lens 52D, and changes of the optical paths of the light incident on the lens cells 51d1, 52d2, 52d3, and 52d4 (dashed lines). These lens cells 51d1, 52d2, 52d3, and 52d4 have respective material refractive indices n1, n2, n3, and n4. These material refractive indices have a magnitude relation represented by n1>n2>n3>n4.

FIGS. 19A, 19B, and 19C illustrate exemplary arrangements of the four lens cells different from each other in any one of parameters in the plane of the fly-eye lens including the lens pitch (P), the radius of curvature (R), the on-axis thickness (t), and the material refractive index (n), and an effective diameter (dashed line). The references X1, X2, X3, and X4 in these drawings indicate areas in which respective lens cells assigned with references having identical numbers at the end are arranged. For example, in a case where the fly-eye lens is configured by, for example, the lens cells

51a1, 52a2, 52a3, and 52a4 having different lens pitches (P), the lens cell 51a1 having a lens pitch P1 is arranged in X1, the lens cell 51a2 having a lens pitch P2 is arranged in X2, the lens cell 51a3 having a lens pitch P3 is arranged in X3, and the lens cell 51a4 having a lens pitch P4 is arranged in X4. Accordingly, as illustrated in FIG. 15, for example, the fly-eye lens 52A is obtained which exhibits an illumination light intensity distribution having a maximum intensity at its central portion.

Note that it is sufficient that the exemplary arrangement of the lens cells in the plane of the fly-eye lens has a configuration that allows the intensity distribution illustrated in FIG. 15 to be obtained, and that the exemplary arrangement of the lens cells is not limited to the three examples illustrated in FIGS. 19A, 19B and 19C.

(3-2. Workings and Effects)

The output unit 50 in the image display apparatus 3 includes the illumination range control unit 52 configured by the fly-eye lens (the fly-eye lens 52A, 52B, 52C, or 52D) including the four lens cells different from each other in any one of the lens pitch (P), the radius of curvature (R), the on-axis thickness (t), and the material refractive index (n). Accordingly, it is possible to project the image light Li having a larger intensity distribution in the central portion than in the peripheral portion to the reflection mirror 15.

FIG. 20 illustrates the illumination light intensity distribution of image light Li1000 incident on the optical modulator 1300 in the typical image display apparatus illustrated in, for example, FIGS. 8A and 8B. When the image light Li1000, which has a uniform intensity distribution as described above, is projected to the full circumference screen, the full circumference screen has a luminance distribution in which the luminance decreases with distance from the reflection mirror 1500, as illustrated in FIG. 21. Thus, in the typical image display apparatus provided with a full-circumference screen, an image projected to the screen is bright at its top but dark at its bottom.

In contrast, in the image display apparatus 3 of the present embodiment, the fly-eye lens (the fly-eye lens 52A, 52B, 52C, or 52D) including the four lens cells different from each other in any one of the lens pitch (P), the radius of curvature (R), the on-axis thickness (t), and the material refractive index (n) is used as the illumination range control unit 52, and the image light Li having a larger intensity distribution in the central portion than in the peripheral portion is projected to the reflection mirror 15, as illustrated in FIG. 15. Accordingly, the luminance of the screen 20 become uniform regardless of the position (height), as illustrated in FIG. 22. Therefore, it is possible to improve the image quality.

Note that, in the present embodiment, the fly-eye lens used as the illumination range control unit 52 is exemplified as the fly-eye lens 52A including the four lens cells 51a1, 52a2, 52a3, and 52a4 having different lens pitches (P), the fly-eye lens 52B including the four lens cells 51b1, 52b2, 52b3, and 52b4 having different radii of curvature (R), the fly-eye lens 52C including the four lens cells 51c1, 52c2, 52c3, and 52c4 having different on-axial thicknesses (t), and the fly-eye lens 52C including the four lens cells 51d1 52d2, 52d3, and 52d4 having different material refractive indices (n). The configuration of the fly-eye lens used as the illumination range control unit 52, however, is not limited to these examples.

For example, although the fly-eye lens includes the four lens cells different from each other in any one of the lens pitch (P), the radius of curvature (R), the on-axis thickness (t), and the material refractive index (n) in the above-described embodiment, the fly-eye lens may include, for example, two lens cells, three lens cells, or five or more lens cells. Alternatively, the fly-eye lens may include a plurality of lens cells different from each other in all of the lens pitch (P), the radius of curvature (R), the on-axis thickness (t), and the material refractive index (n).

Further, the outer shapes of the lens cells of the fly-eye lens (e.g., the fly-eye lens 52A, 52B, 52C, or 52D) used as the illumination range control unit 52 preferably have the aspect ratios substantially the same as the aspect ratio of the outer shape of the reflection mirror 15, as in the first embodiment described above. Accordingly, it is possible to improve the illumination efficiency of the reflection mirror 15 while reducing the difference in luminance between the top and the bottom of the screen 20, resulting in a further improvement in the image quality.

Furthermore, although the intensity distribution in the plane of the illumination range S has a larger intensity in its central portion than in its peripheral portion in the present embodiment, the illumination range control unit 52 may be configured such that the intensity distribution has a maximum intensity in the peripheral portion around the central portion. Using the illumination range control unit 52 having such a intensity distribution further improves the illumination efficiency of the image light Li and further improves the image quality.

Described next is an optical system of the output unit (e.g., the output unit 10) in each of the image display apparatuses 1 to 3 according to the first embodiment described above, for example.

<4. Example of Optical System of Image Display Apparatus>

(Configuration Example 1)

FIG. 23 illustrates an optical system (an output unit 10A) of a single-plate reflective liquid crystal image display apparatus (e.g., the image display apparatus 1) that performs light modulation using a reflective liquid crystal panel (LCOS). The output unit 10A includes light source sections 100R, 100G, and 100B respectively corresponding to RGB, coupling lenses 111R, 111G, and 111B, dichroic prisms 112 and 113, a fly-eye lens 114, a main condensing lens 115, a channel condensing lens 116, a polarizing beam splitter (PBS) 117, and an LCOS 118.

The light source sections 100R, 100G, and 100B output, for example, laser beams respectively corresponding to the colors RGB constituting the image light Li. For instance, the light source sections 100R, 100G, and 100B correspond to the light source 11 in the first embodiment described above. A green light beam Lg outputted from the light source section 100G is incident on the dichroic prism 112 after passing through the coupling lens 111G, and is reflected from the dichroic prism 112 toward the dichroic prism 113. A blue light beam Lb outputted from the light source section 100B passes through the coupling lens 111G and the dichroic prism 112, and is outputted toward the dichroic prism 113. A red light beam Lr outputted from the light source section 100R is incident on the dichroic prism 113 after passing through the coupling lens 111R.

The dichroic prism 113 selectively transmits the green light beam Lg and the blue light beam Lb and selectively reflects the red light beam Lr. The dichroic prism 113 combines the red light beam Lr, the green light beam Lg, and the blue light beam Lb into image light Li, and outputs the image light Li toward the fly-eye lens 114.

The fly-eye lens 114 corresponds to, for example, the illumination range control unit 12 in the first embodiment described above, and controls the illumination range of the image light Li. The image light Li is adjusted by the fly-eye lens 114 such that the illumination range S of the image light Li has an aspect ratio substantially the same as the aspect ratio of the reflection mirror 15 before being outputted toward the main condensing lens 115. The main condensing lens 115 and the channel condensing lens 116 transmit the light (the image light Li) outputted from the fly-eye lens 114 and condense the light on the LCOS 118.

The LCOS 118 converts the polarization of the image light Li passing through the main condensing lens 115, the channel condensing lens 116, and the PBS 117, and outputs the resultant light toward the PBS 117. The image light Li reflected from the LCOS 118 and incident on the PBS 117 is reflected from the PBS 117 and outputted toward the projector lens 119.

Although not illustrated, the projector lens 119 has a plurality of lens or the like, for example. The projector lens 119 corresponds to, for example, the projector lens 14 of the first embodiment described above. The projector lens 119 enlarges the image light Li into the predetermined illumination range S and projects the light to the reflection mirror 15.

(Configuration Example 2)

FIG. 24 illustrates an optical system (an output unit 10B) of a reflective 3LCD image display apparatus (e.g., the image display apparatus 1) that performs light modulation using a reflective liquid crystal panel (LCOS). The output unit 10B includes a light source section 100, an illumination optical system 210, an image forming section 220, and a projection optical system 230.

Like the light source sections 100R, 100G, 100B in Configuration Example 1 described above, the light source section 100 is configured by, for example, a solid-state light source, such as a semiconductor laser or a light emitting diode (LED), that outputs laser beams respectively corresponding to the colors RGB constituting the image light Li. Alternatively, the light source section 100 may be configured by, for example, a halogen lamp, a metal halide lamp, or a xenon lamp. Still alternatively, the light source section 100 may be configured by the combination of a solid-state light source that emits excitation light or a laser beam and a wavelength conversion unit such as a phosphor wheel from a position near the light source section 100.

The illumination optical system 210 includes, for example, a fly-eye lens 211, a polarization converting element 212, a lens 213, dichroic mirrors 214A and 214B, reflection mirrors 215A and 215B, lenses 216A and 216B, a dichroic mirror 217, and polarizing plates 218A to 218C.

The fly-eye lens 211 corresponds to, for example, the illumination range control unit 12 in the first embodiment described above, and controls the illumination range of the image light Li. The polarization converting element 212 serves to align the polarization axis of incident light in a predetermined direction. For example, the polarization converting element 212 converts light other than P-polarized light into P-polarized light. The lens 213 focuses the light outputted from the polarization converting element 212 toward the dichroic mirrors 214A and 214B.

The dichroic mirrors 214A and 214B selectively reflect light having a wavelength within a predetermined wavelength range and selectively transmit light having a wavelength outside the predetermined wavelength range. For example, the dichroic mirror 214A mainly reflects the red light beam Lr toward the reflection mirror 215A. Additionally, the dichroic mirror 214B reflects mainly the blue light beam Lb toward the reflection mirror 215B. Thus, the green light beam Lg mainly passes through both the dichroic mirrors 214A and 214B and is directed toward a reflective polarizing plate 221C (described below) of the image forming section 220.

The reflection mirror 215A reflects light outputted from the dichroic mirror 214A (mainly the red light beam Lr) toward the lens 216A, while the reflection mirror 215B reflects light outputted from the dichroic mirror 214B (mainly the blue light beam Lb) toward the lens 216B. The lens 216A transmits light outputted from the reflection mirror 215A (mainly the red light beam Lr) and focuses the light to the dichroic mirror 217. The lens 216B transmits light (mainly the blue light beam Lb) outputted from the reflection mirror 215B and focuses the light to the dichroic mirror 217.

The dichroic mirror 217 selectively reflects green light beam Lg and selectively transmits light having a wavelength other than that of the green light beam Lg. Here, the dichroic mirror 217 transmits a red light component of the light received from the lens 216A. In a case where the light received from lens 216A contains a green light component, the dichroic mirror 217 reflects the green light component toward a polarizing plate 280C. The polarizing plates 218A to 218C each include a polarizer having a polarization axis oriented in a predetermined direction. For example, the polarizing plates 218A to 218C transmit the P-polarized light obtained as the result of the conversion by the polarization converting element 212, and reflect S-polarized light.

The image forming section 220 includes reflective polarizing plates 221A to 221C, reflective liquid crystal panels 222A to 222C (the optical modulator 13), and a dichroic prism 223.

The reflective polarizing plates 221A to 221C transmit light (e.g., P-polarized light) having the same polarization axis as the polarization axis of the polarized light emitted from the polarizing plates 218A to 218C, and reflect light having another polarization axis (S-polarized light). Specifically, the reflective polarizing plate 221A transmits P-polarized red light emitted from the polarizing plate 218A toward the reflective liquid crystal panel 222A. A reflective polarizer 221B transmits P-polarized blue light emitted from the polarizing plate 218B toward the reflective liquid crystal panel 222B. The reflective polarizing plate 221C transmits P-polarized green light emitted from the polarizing plate 218C toward the reflective liquid crystal panel 222C. Further, the P-polarized green light having passed through both the dichroic mirrors 214A and 214B and having been incident on the reflective polarizing plate 221C passes through the reflective polarizing plate 221C as it is, and enters the dichroic prism 223. Further, the reflective polarizer 221A reflects the S-polarized red light emitted from the reflective liquid crystal panel 222A so that the S-polarized red light is incident on the dichroic prism 223. The reflective polarizer 221B reflects the S-polarized blue light emitted from the reflective liquid crystal panel 222B so that the S-polarized blue light is incident on the dichroic prism 223. The reflective polarizing plate 221C reflects the S-polarized green light emitted from the reflective liquid crystal panel 222C so that the S-polarized green light is incident on the dichroic prism 223.

The reflective liquid crystal panels 222A to 222C perform spatial modulation of red light beam Lr, blue light beam Lb, and green light beam Lg, respectively. The dichroic prism 223 combines the red light beam Lr, the blue light beam Lb and the green light beam Lg incident thereon, and outputs the combined light toward the projection optical system 230.

Although not illustrated, the projection optical system 230 includes, for example, a plurality of lenses or the like. The projection optical system 230 enlarges the output light (the image light Li) entering from the image forming section 220 into the predetermined illumination range S, and projects the light to the reflection mirror 15.

(Configuration Example 3)

FIG. 25 is a schematic diagram illustrating an exemplary configuration of an optical system (an output unit 10C) of a transmissive 3LCD image display apparatus (e.g., the image display apparatus 1) that performs light modulation using a transmissive liquid crystal panel. The output unit 10C includes, for example, a light source section 100, an image generating system 300 including an illumination optical system 310 and an image generating section 330, and a projection optical system 340. Note that the light source section 100 includes, for example, the same configuration as the light source section 100 in Configuration Example 2.

The illumination optical system 310 includes, for example, a fly-eye lens 311, a polarization converting element 312, and a condensing lens 313. The fly-eye lens 311 corresponds to, for example, the illumination range control unit 12 in the first embodiment described above, and controls the illumination range of the image light Li. The polarization converting element 312 serves to align the polarization state of incident light entering through the fly-eye lens 311 or the like. The polarization converting element 312 outputs output light including blue light beam Lb, green light beam Lg, and red light beam Lr via a lens disposed on an output side of the light source section 100, for example.

The illumination optical system 310 further includes dichroic mirrors 314 and 315, mirrors 316, 317, and 318, relay lenses 319 and 320, field lenses 321R, 321G, and 321B, liquid crystal panels 331R, 331G and 331B serving as the image generating section 330, and a dichroic prism 332.

The dichroic mirrors 314 and 315 each have a property of selectively reflecting color light having a wavelength within a predetermined wavelength range and transmitting light having a wavelength outside the predetermined wavelength range. For example, the dichroic mirror 314 selectively reflects the red light beam Lr. The dichroic mirror 315 selectively reflects the green light beam Lg out of the green light beam Lg and the blue light beam Lb having passed through the dichroic mirror 314. The remaining blue light beam Lb passes through the dichroic mirror 315. The light outputted from the light source section 100 is thereby separated into a plurality of color light beams of different colors.

The red light beam Lr obtained as the result of the separation is reflected by the mirror 316, parallelized while passing through the field lens 321R, and incident on the liquid crystal panel 331R that modulates red light. The green light beam Lg is parallelized while passing through the field lens 321G and incident on the liquid crystal panel 331G that modulates green light. The blue light beam Lb passes through the relay lens 319 and is reflected from the mirror 317, and further passes through the relay lens 320 and is reflected from the mirror 318. The blue light beam Lb reflected from the mirror 318 is parallelized while passing through the field lens 321B and incident on the liquid crystal panel 331B that modulates blue light beam Lb.

The liquid crystal panels 331R, 331G, and 331B are electrically coupled to a non-illustrated signal source (e.g., a PC or the like) that supplies image signals containing image information. The liquid crystal panels 331R, 331G, and 331B modulate the incident light per pixel on the basis of the supplied image signals of respective colors, and respectively generate red, green, and blue images. The modulated color light beams (the generated images) are incident on the dichroic prism 332 and combined. The dichroic prism 332 superimposes or combines the color light beams incident from the three directions, and emits the combined light toward the projection optical system 340.

Although not illustrated, the projection optical system 340 includes, for example, a plurality of lens or the like, as in Configuration Example 2. The projection optical system 340 enlarges the output light (the image light Li) entering from the image generating system 300 into the predetermined illumination range S, and projects the light to the reflection mirror.

In Configuration Examples 1 to 3 described above, the exemplary configuration of the output unit 10 (10A to 10C) is described that uses the LCOS 118, the reflective liquid crystal panels 222A to 222C, or the transmissive liquid crystal panels 331A to 331C as the optical modulator 13. The present technology, however, may also be applied to an image display apparatus using a DMD or a MEMS mirror.

(Configuration Example 4)

FIG. 26 is a schematic diagram illustrating an exemplary optical system (an output unit 10D) of a DLP projector (e.g., the image display apparatus 1) using a DMD. The output unit 10D includes a fly-eye lens 411, a main condensing lens 412, a channel condensing lens 413, an internal totally-reflective prism (TIR prism) 414, a DMD 415, and a projector lens 416. Note that the light source section 100 has, for example, the same configuration as the light source section 100 in Configuration Example 2.

(Configuration Example 5)

FIG. 27 is a block diagram illustrating an overall configuration of a projector (e.g., the image display apparatus 1) using a MEMS mirror. The projector has a controller 511, a laser driver 512 that controls the light source sections (laser light source sections) 100R, 100G, and 100B, and a mirror driver 513 that controls a MEMS mirror 517. The projector further includes a reflection mirror 514, polarization converting elements 515 and 516, a MEMS mirror 517, and a plurality of lenses 518 and 519. The present technology may also be applied to an image display apparatus using a MEMS mirror in a case were the illumination range control unit described above (e.g., the illumination range control unit 12) is disposed between the polarization converting element 516 and the MEMS mirror 517.

The present disclosure has been described above with reference to the first and second embodiments and the modification examples. The present disclosure, however, is not limited to the embodiments and the like described above and may be modified in various ways.

Further, the screen (e.g., the screen 20) displays a 2D image in the above embodiment or the like. The present technology, however, may be applied to an image display apparatus capable of displaying a 3D image.

Note that the effects described herein are not necessarily limitative, and any effect described in the present disclosure may be made.

Note that the present disclosure may also be configured as follows. According to the present technology having the following configurations, the second optical member is disposed in the output unit including the light source. The second optical member adjusts the illumination range of projection light to be incident on the first optical member such that the illumination range has an aspect ratio substantially the same as the aspect ratio of the outer shape of the first optical member. The first optical member controls the incident angle of the projection light to be incident on the irradiation target member. This improves the utilization efficiency of the projection light. Therefore, it is possible to improve the image quality.

(1) An image display apparatus including:
an output unit including a light source and outputting projection light outputted from the light source along a predetermined axis;
an irradiation target member to be irradiated with the projection light;
a first optical member disposed opposite to the output unit along the predetermined axis and controlling an incident angle of the projection light to be incident on the irradiation target member; and
a second optical member included in the output unit and adjusting an illumination range of the projection light to be incident on the first optical member such that the illumination range has an aspect ratio substantially the same as an aspect ratio of an outer shape of the first optical member.

(2) The image display apparatus according to (1) described above, in which the second optical member adjusts the illumination range of the projection light such that the illumination range is in close contact with a periphery of the outer shape of the first optical member.

(3) The image display apparatus according to (1) or (2) described above, in which
the first optical member has a substantially circular outer shape, and
the illumination range of the projection light incident on the first optical member has a peripheral portion in close contact with at least any four points on a circumference of the first optical member.

(4) The image display apparatus according to any one of (1) to (3) described above, in which the second optical member applies a larger intensity distribution to a central portion of the projection light outputted from the light source than to a peripheral portion of the projection light, and emits the projection light.

(5) The image display apparatus according to any one of (1) to (3) described above, in which the second optical member applies an intensity distribution having a maximum intensity at a peripheral portion around a central portion to the projection light outputted from the light source, and emits the projection light.

(6) The image display apparatus according to any one of (1) to (5) described above, in which the second optical member is a fly-eye lens including a plurality of lens cells each having a square, pentagonal, or higher polygonal shape.

(7) The image display apparatus according to (6) described above, in which the fly-eye lens includes a plurality types of lens cells different from each other in any one of a lens pitch, a radius of curvature, an on-axis thickness, and a material refractive index.

(8) The image display apparatus according to any one of (1) to (5) described above, in which the second optical member is a rod integrator lens having a cylindrical, quadrangular, or higher polygonal prismatic shape.

(9) The image display apparatus according to any one of (1) to (5) described above, in which the second optical member is a holographic optical element that transmits and scatters the projection light.

(10) The image display apparatus according to (9) described above, in which the holographic optical element is a volume type hologram or a surface-relief hologram.

(11) The image display apparatus according to any one of (1) to (5) described above, in which the second optical member is a diffuser plate in which fine particles are diffused.

(12) The image display apparatus according to any one of (1) to (5) described above, in which the second optical member is a micro electro mechanical system (MEMS) mirror.

(13) The image display apparatus according to any one of (1) to (12) described above, in which the projection light is incident on the irradiation target member at an incident angle of 40° or greater and 75° or less.

(14) The image display apparatus according to any one of (1) to (13) described above, in which the light source is any one of a semiconductor laser, a light emitting diode, a halogen lamp, a metal halide lamp, and a xenon lamp.

(15) The image display apparatus according to any one of (1) to (14) described above, in which the irradiation target member is a transmissive screen having a light transmitting property or a reflective screen.

(16) The image display apparatus according to (15) described above, in which the screen is any one of a hologram screen, a Fresnel screen, and a scattering particle screen.

(17) The image display apparatus according to any one of (1) to (16) described above, in which the irradiation target member is disposed over an entire circumference around the output unit.

(18) The image display apparatus according to any one of (1) to (17), in which the irradiation target member has a cylindrical shape.

This application claims the priority of Japanese Patent Application No. 2019-086535 filed with the Japanese Patent Office on Apr. 26, 2019, the entire contents of which are incorporated herein by reference.

Those skilled in the art could conceive of various modifications, combinations, sub-combinations, and changes in accordance with design requirements and other factors. However, it is understood that they are included within the scope of the appended claims or the equivalents thereof.

The invention claimed is:
1. An image display apparatus comprising:
an output unit including a light source, wherein the output unit is configured to output projection light outputted from the light source along a specific axis;
an irradiation target member to be irradiated with the projection light;
a first optical member opposite to the output unit along the specific axis and configured to control an incident angle of the projection light to be incident on the irradiation target member; and
a second optical member in the output unit and configured to an illumination range of the projection light to be incident on the first optical member such that the illumination range has an aspect ratio substantially same as an aspect ratio of an outer shape of the first optical member.

2. The image display apparatus according to claim 1, wherein the second optical member is further configured to adjust the illumination range of the projection light such that the illumination range is in close contact with a periphery of the outer shape of the first optical member.

3. The image display apparatus according to claim 1, wherein
the first optical member has a substantially circular outer shape, and
the illumination range of the projection light incident on the first optical member has a peripheral portion in close contact with at least any four points on a circumference of the first optical member.

4. The image display apparatus according to claim 1, wherein the second optical member is further configured to apply a larger intensity distribution to a central portion of the projection light outputted from the light source than to a peripheral portion of the projection light, and emits the projection light.

5. The image display apparatus according to claim 1, wherein the second optical member further configured to apply an intensity distribution having a maximum intensity at a peripheral portion around a central portion to the projection light outputted from the light source, and emits the projection light.

6. The image display apparatus according to claim 1, wherein the second optical member comprises a fly-eye lens including a plurality of lens cells each having a square, pentagonal, or higher polygonal shape.

7. The image display apparatus according to claim 6, wherein the fly-eye lens includes a plurality types of lens cells different from each other in any one of a lens pitch, a radius of curvature, an on-axis thickness, and a material refractive index.

8. The image display apparatus according to claim 1, wherein the second optical member comprises a rod integrator lens having a cylindrical, quadrangular, or higher polygonal prismatic shape.

9. The image display apparatus according to claim 1, wherein the second optical member comprises a holographic optical element configured to transmit and scatter the projection light.

10. The image display apparatus according to claim 9, wherein the holographic optical element comprises a volume type hologram or a surface-relief hologram.

11. The image display apparatus according to claim 1, wherein the second optical member comprises a diffuser plate in which fine particles are diffused.

12. The image display apparatus according to claim 1, wherein the second optical member comprises a micro electro mechanical system (MEMS) mirror.

13. The image display apparatus according to claim 1, wherein the projection light is incident on the irradiation target member at an incident angle of 40° or greater and 75° or less.

14. The image display apparatus according to claim 1, wherein the light source comprises one of a semiconductor laser, a light emitting diode, a halogen lamp, a metal halide lamp, or a xenon lamp.

15. The image display apparatus according to claim 1, wherein the irradiation target member comprises a transmissive screen having a light transmitting property or a reflective screen.

16. The image display apparatus according to claim 15, wherein the screen comprises one of a hologram screen, a Fresnel screen, or a scattering particle screen.

17. The image display apparatus according to claim 1, wherein the irradiation target member is over an entire circumference around the output unit.

18. The image display apparatus according to claim 1, wherein the irradiation target member has a cylindrical shape.

* * * * *